(12) United States Patent
Park et al.

(10) Patent No.: US 10,455,170 B2
(45) Date of Patent: Oct. 22, 2019

(54) IMAGE PROCESSING DEVICE, DISPLAY DEVICE, AND HEAD MOUNTED DISPLAY DEVICE

(71) Applicant: Samsung Display Co., Ltd., Yongin-si, Gyeonggi-do (KR)

(72) Inventors: Ji-Eun Park, Hwaseong-si (KR); Jin-Woo Noh, Hwaseong-si (KR); Young-Wook Yoo, Suwon-si (KR); Jae-Keun Lim, Suwon-si (KR); Hassan Kamal, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/679,800

(22) Filed: Aug. 17, 2017

(65) Prior Publication Data
US 2018/0098006 A1 Apr. 5, 2018

(30) Foreign Application Priority Data
Sep. 30, 2016 (KR) .......................... 10-2016-0126214

(51) Int. Cl.
*H04N 5/357* (2011.01)
*G02B 27/01* (2006.01)
*G06T 3/40* (2006.01)

(52) U.S. Cl.
CPC ......... *H04N 5/3572* (2013.01); *G02B 27/017* (2013.01); *G02B 27/0172* (2013.01); *G06T 3/4007* (2013.01); *G06T 3/4076* (2013.01); *G02B 2027/0147* (2013.01)

(58) Field of Classification Search
CPC .................. H04N 5/3572; G02B 27/0172; G06T 3/4007; G06T 3/4076
See application file for complete search history.

(56) References Cited

U.S. PATENT DOCUMENTS

| | | | |
|---|---|---|---|
| 9,013,503 B2* | 4/2015 | Jang ..................... | G09G 5/02 345/22 |
| 2003/0085906 A1* | 5/2003 | Elliott .................. | G09G 3/20 345/613 |
| 2005/0057645 A1* | 3/2005 | Sung .................... | H04N 13/243 348/43 |
| 2005/0243109 A1* | 11/2005 | Stevens ................ | G06T 3/4007 345/694 |
| 2006/0087585 A1* | 4/2006 | Seo ..................... | H04N 21/25808 348/385.1 |
| 2007/0076971 A1* | 4/2007 | Roimela ............... | H04N 19/176 382/251 |
| 2007/0181246 A1* | 8/2007 | Yamashita ............ | G02F 1/133305 156/235 |

(Continued)

FOREIGN PATENT DOCUMENTS

KR 10-2013-0105145 A 9/2013

*Primary Examiner* — Abderrahim Merouan
(74) *Attorney, Agent, or Firm* — Innovation Counsel LLP

(57) ABSTRACT

An image processor includes a scaling unit configured to output converted data by resizing first image data; and a rendering unit configured to receive second image data, to output rendering data by rendering the second image data, and to calculate a target rendering data value based on data values corresponding to a first block of M*N among the second image data, where each of M and N is an integer greater than or equal to 2. Here, the second image data is the converted data, or the first image data is the rendering data.

8 Claims, 25 Drawing Sheets

(56) References Cited

U.S. PATENT DOCUMENTS

| | | | |
|---|---|---|---|
| 2012/0056876 A1* | 3/2012 | Lee | H04N 13/122 |
| | | | 345/419 |
| 2013/0321869 A1* | 12/2013 | Cave | G06K 15/1878 |
| | | | 358/2.1 |
| 2014/0063041 A1* | 3/2014 | Jang | G09G 5/02 |
| | | | 345/591 |
| 2014/0266985 A1 | 9/2014 | Harrison et al. | |
| 2015/0379697 A1 | 12/2015 | Pohl | |
| 2015/0379916 A1* | 12/2015 | Guo | G02F 1/136286 |
| | | | 345/694 |
| 2016/0093018 A1* | 3/2016 | Wong | G06T 3/4015 |
| | | | 382/167 |
| 2016/0328829 A1* | 11/2016 | Kiyota | E02F 9/261 |
| 2017/0023718 A1* | 1/2017 | Son | G02B 5/3075 |
| 2017/0061840 A1* | 3/2017 | Ko | G09G 3/006 |

\* cited by examiner

FIG. 5E

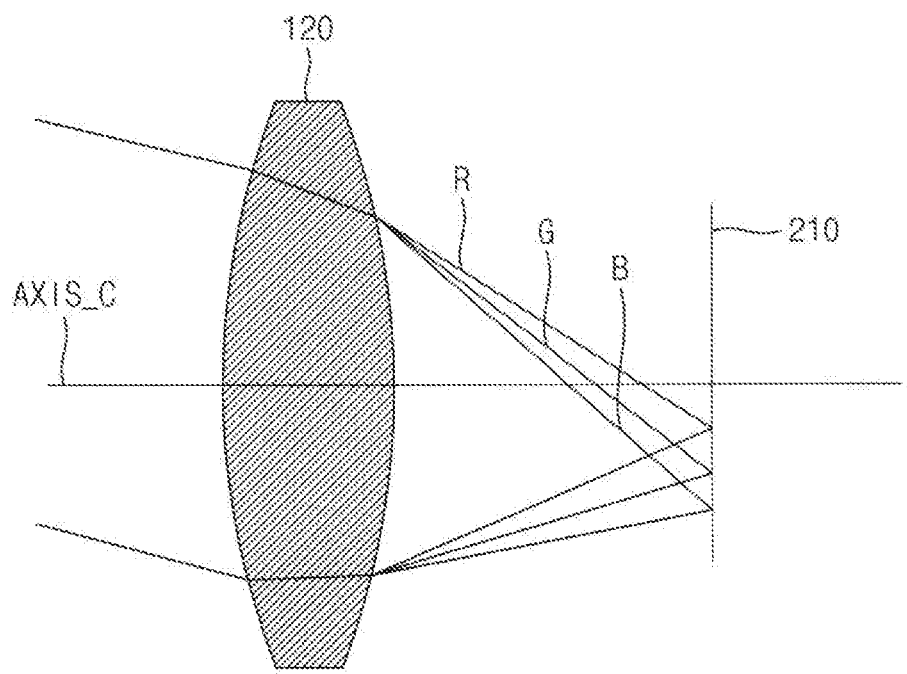

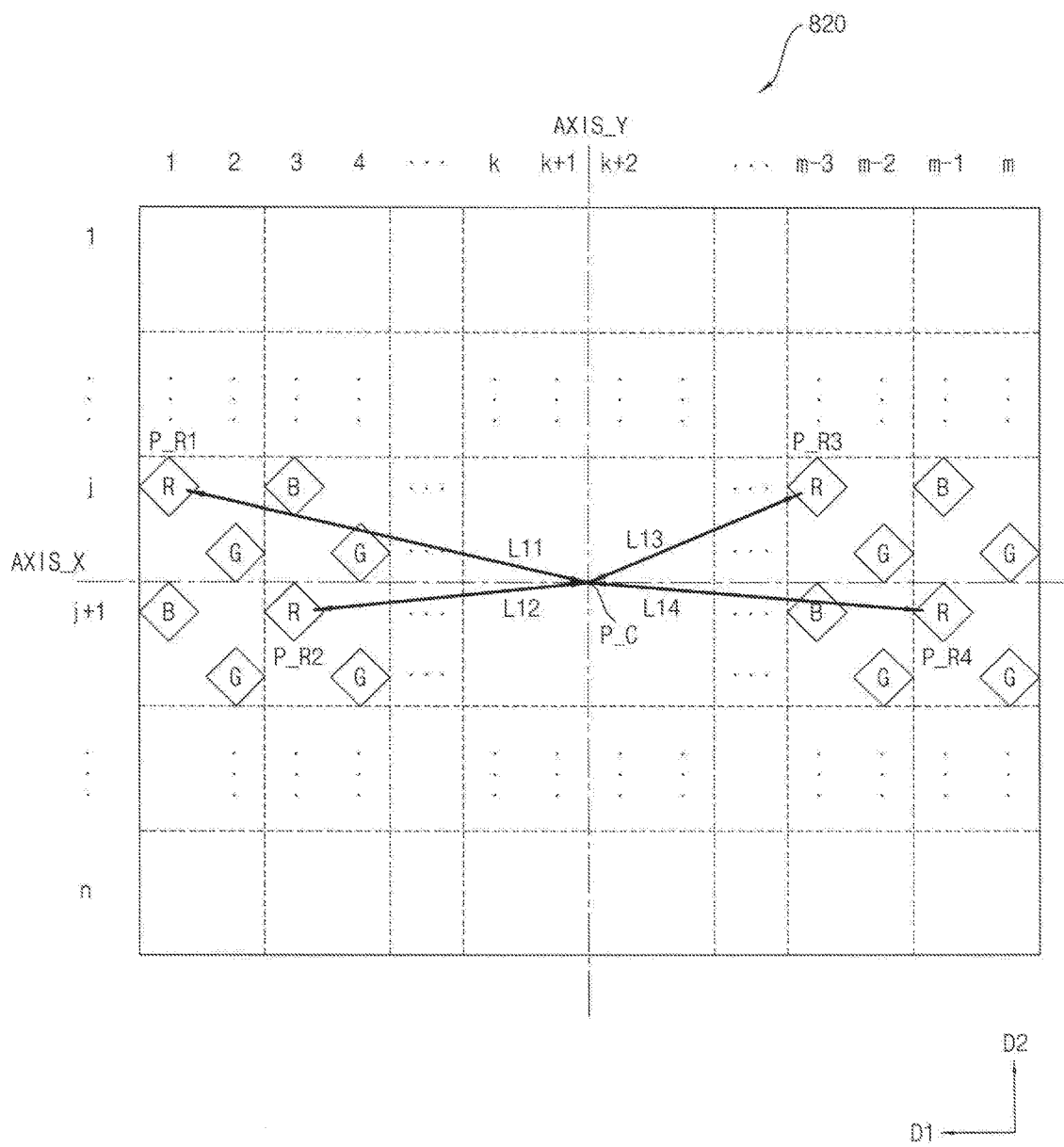

IMAGE PROCESSING DEVICE, DISPLAY DEVICE, AND HEAD MOUNTED DISPLAY DEVICE

CROSS-REFERENCE TO RELATED APPLICATION(S)

This application claims priority under 35 USC § 119 to Korean Patent Application No. 10-2016-0126214, filed on Sep. 30, 2016 in the Korean Intellectual Property Office (KIPO), the contents of which are incorporated herein in its entirety by reference.

BACKGROUND

1. Technical Field

Example embodiments relate to a display device. More particularly, embodiments of the present inventive concept relate to an image processing device, display device, and a head mounted display device.

2. Description of the Related Art

A head mounted display device (referred as to "HMD") may be mounted on a head of a user, may enlarge an image displayed by a display panel using a lens, and may provide the enlarged image direct to eyes of a user.

A pixel density of a display panel (e.g., a high resolution display panel) is 500 pixels per inch (PPI) such that a pixel in the display panel is not visible to the user. However, a pixel in the head mounted display device is visible to the user because the head mounted display device uses the lens. Here, a screen door effect or an artifact (e.g., a phenomenon that some single colors are visible to the user in a boundary of an object in the image) occurs.

SUMMARY

Some example embodiments provide an image processing device reducing an artifact which is visible to a user.

Some example embodiments provide a display device including the image processing device.

Some example embodiments provide a head mounted display device including the image processing device.

According to example embodiments, an image processor may include a scaling unit configured to output converted data by resizing first image data; and a rendering unit configured to receive second image data, to output rendering data by rendering the second image data, and to calculate a target rendering data value based on data values corresponding to a first block of M*N among the second image data, where each of M and N is an integer greater than or equal to 2. Here, the second image data may be the converted data, or the first image data may be the rendering data.

In example embodiments, the rendering unit may be configured to calculate the target rendering data value by weight-averaging the data values and may reconstruct the second image data in a first format into the rendering data in a second format.

In example embodiments, the second image data may include a first type data value, a second type data value, and a third type data value sequentially and repeatedly arranged in a first direction, and the rendering data may include a fourth type data value, a fifth type data value, a sixth type data value, and a seventh type data value sequentially and repeatedly arranged in the first direction. Here, the first type data value and the fourth type data value corresponds to a first pixel configured to emit light with a first color, the second type data value, the fifth type data value, and the seventh type data value corresponds to a second pixel configured to emit light with a second color, and the third type data value and the sixth type data value corresponds to a third pixel configured to emit light with a third color.

In example embodiments, the second image data may include a left image data corresponding to a left eye of a user and a right image data corresponding to a right eye of the user.

In example embodiments, the rendering unit may be configured to render the second image data using a first sub-filter having weight values for the data values, where the first block has a size of 2*2.

In example embodiments, the first sub-filter may have a first weight value for a first target data value among the data values, a second weight value for a first adjacent data value which is adjacent to the first target data value in a first direction, a third weight value for a second adjacent data value which is adjacent to the first target data value in a second direction, and a fourth weight value for a third adjacent data value which is adjacent to the second target data value in the first direction, where the second direction is perpendicular to the first direction.

In example embodiments, the rendering unit may be configured to operate in a normal mode or in a wearable mode, may be configured to render the second image data using a second sub-filter in the normal mode, and may be configured to render the second image data using a first sub-filter in the wearable mode. Here, the first sub-filter may have a first weight value for a first target data value among the data values, a second weight value for a first adjacent data value which is adjacent to the first target data value in a first direction, a third weight value for a second adjacent data value which is adjacent to the first target data value in a second direction, and a fourth weight value for a third adjacent data value which is adjacent to the second target data value in the first direction, and the second sub-filter may have a twenty-first weight value for the first target data value and a twenty-second weight value for the first adjacent data value, where the second direction is perpendicular to the first direction.

In example embodiments, the scaling unit may be configured to determine scaling variables based on distances of sub-pixels arranged in a display panel with respect to a reference point on the display panel configured to display an image based on the converted data or the rendering data and may resize the first image data based on the scaling variables.

In example embodiments, the scaling unit may be configured to extract color data consisted with a same color from the first image data and may be configured to resize at least one of the color data based on the scaling variables.

In example embodiments, the scaling unit may be configured to divide the at least one of the color data into partial image data, may be configured to generate partial converted data by resizing the partial image data based on the scaling variables, and may be configured to generate the converted data by combining the partial converted data.

In example embodiments, the scaling unit may be configured to divide the at least one of the color data into first partial data and second partial data based on a second axis extending in a second direction with respect to a reference point of an image corresponding to the at least one of the color data and may be configured to resize the first partial data using a first scaling variable and the second partial data using a second scaling variable. Here, the second scaling variable may be different from the first scaling variable.

In example embodiments, the scaling unit may be configured to divide resized color data into third partial data and fourth partial data based on a first axis extending in a first direction with respect to the reference point of the image and may be configured to resize the third partial data using a third scaling variable and the fourth partial data using a fourth scaling variable. Here, the resized color data may include the resized first partial data and the resized second partial data, and the fourth scaling variable may be different from the third scaling variable.

In example embodiments, the scaling unit may be configured to divide the at least one of the color data into eleventh, twelfth, thirteenth, and fourteenth partial data based on a first axis and a second axis, the first axis extending in a second direction with respect to a reference point of an image corresponding the at least one of the color data, the second axis extending in a second direction with respect to the reference point of the image and may be configured to resize the eleventh partial data using a first scaling variable and a third scaling variable, may be configured to resize the twelfth partial data using a second scaling variable and the third scaling variable, may be configured to resize the thirteenth partial data using the first scaling variable and a fourth scaling variable, and may be configured to resize the fourteenth partial data using the third scaling variable and the fourth scaling variable. Here, the second direction may be perpendicular to the first direction, the second scaling variable may be different from the first scaling variable, and the fourth scaling variable may be different from the third scaling variable.

According to example embodiments, an image processor may include a divider configured to divide first image data into partial data based on at least one of colors and regions; and a scaler configured to generate partial converted data by resizing the partial data based on scaling variables; an integrator configured to output converted data by combining the partial data. Here, the colors may constitute an image displayed based on the first image data, and the regions may correspond to portions of the image.

According to example embodiments, a display device may include an image processor configured to output second data by converting first data; a display panel including pixels; and a data driver configured to generate data signals based on the second data and to provide the data signals to the pixels. Here, the image processor may include a scaling unit configured to output converted data by resizing first image data; and a rendering unit configured to receive second image data, to output rendering data by rendering the second image data and to calculate a target rendering data value based on data values corresponding to a first block of M*N among the second image data, where each of M and N is an integer greater than or equal to 2. Here, the second image data may be the converted data, or the first image data may be the rendering data.

In example embodiments, the scaling unit may be configured to extract color data consisted with a same color from the first image data and may resize at least one of the color data based on scaling variables.

In example embodiments, the display panel may be divided into areas with respect to a reference point of an image. Here, the scaling unit may be configured to divide the at least one of the color data into partial data corresponding to the areas, may be configured to generate partial converted data by resizing the partial data based on the scaling variables, and may be configured to generate the converted data by combining the partial converted data.

In example embodiments, the scaling unit may be configured to divide the at least one of the color data into first partial data and second partial data based on a second axis extending in a second direction with respect to the reference point and may be configured to resize the first partial data using a first scaling variable and the second partial data using a second scaling variable. Here, the second scaling variable may be different from the first scaling variable, and the reference point may correspond to a visual axis of a user.

In example embodiments, the first scaling variable may be determined based on location information of a first sub-pixel, and the first sub-pixel may be included in the pixels and located in an outermost position in a first direction perpendicular to the second direction.

According to example embodiments, a head mounted display device may include an image processor configured to output second data by converting first data; a data driver configured to generate data signals based on the second data; a display panel including pixels configured to emit light in response to the data signals; and a lens configured to enlarge an image outputted from the display panel. Here, the image processor may include a scaling unit configured to output converted data by resizing first image data; and a rendering unit configured to receive second image data, to output rendering data by rendering the second image data and to calculate a target rendering data value based on data values corresponding to a first block of M*N among the second image data, where each of M and N is an integer greater than or equal to 2. Here, the second image data may be the converted data, or the first image data may be the rendering data.

Therefore, an image processor according to example embodiments may prevent colors from being seen by a user at edges of an object in an image by rendering image data based on data values corresponding to a first block (e.g., a block having a size of 2*2).

In addition, the image processor may reduce a load by rendering image data using a second sub-filter (or a second sub-rendering filter) in a normal mode and may prevent colors from being seen by a user at edges of an object in an image by rendering image data using a first sub-filter (or a first sub-rendering filer) in a wearable mode.

Furthermore, a display device may compensate a chromatic aberration by resizing image data (or rendering data) using scaling variables which are different for each direction with respect to a reference point of an image.

BRIEF DESCRIPTION OF THE DRAWINGS

Illustrative, non-limiting example embodiments will be more clearly understood from the following detailed description taken in conjunction with the accompanying drawings.

FIGS. 5B, 5C, 5D, 5E, and 5F are a diagram illustrating an example of rendering process using the sub filters of FIG. 5A.

FIG. 8A is a diagram illustrating a chromatic aberration.

FIG. 9A is a diagram illustrating examples of scaling variables used in the second scaling unit of FIG. 7.

DESCRIPTION OF EMBODIMENTS

Hereinafter, the present inventive concept will be explained in detail with reference to the accompanying drawings.

Figure 1:
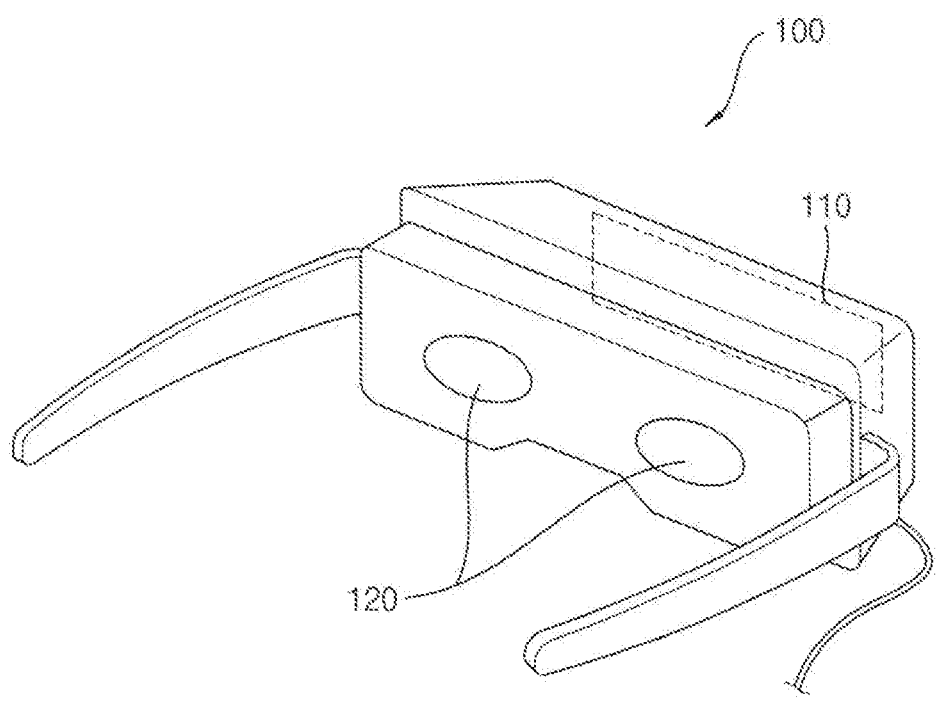
FIG. 1 is a diagram illustrating a head mounted display device according to example embodiments.

FIG. 1 is a diagram illustrating a head mounted display device 100 according to example embodiments.

Referring to FIG. 1, the head mounted display device 100 (or head mounted display system) may include a display device 110 and lenses 120. The head mounted display device 100 may be mounted on a head of a user. The head mounted display device 100 may further include a frame (or a case) to support the display device 110 and the lenses 120. The lenses 120 may be spaced apart to the display device 110 (or to a display panel included in the display device 110) by a specified distance.

The display device 110 may display an image based on image data provided from an external component (e.g., an application processor). For example, the display device 110 may be an organic light emitting display device. The display device 110 may be included in the head mounted display device 100 or may be detachable from the head mounted display device 100. For example, the display device 110 may be a smart phone.

The lenses 120 may directly provide eyes of the user with the image displayed by the display device 110 when the head mounted display device 100 is mounted on the user. For example, the lenses 120 may be eyepieces (or ocular eye pieces).

The head mounted display device 100 may further include other lenses, a reflector, and optical elements forming and adjusting an optical path such that the image displayed by the display device 100 is provided to the eyes of the user.

Figure 2:
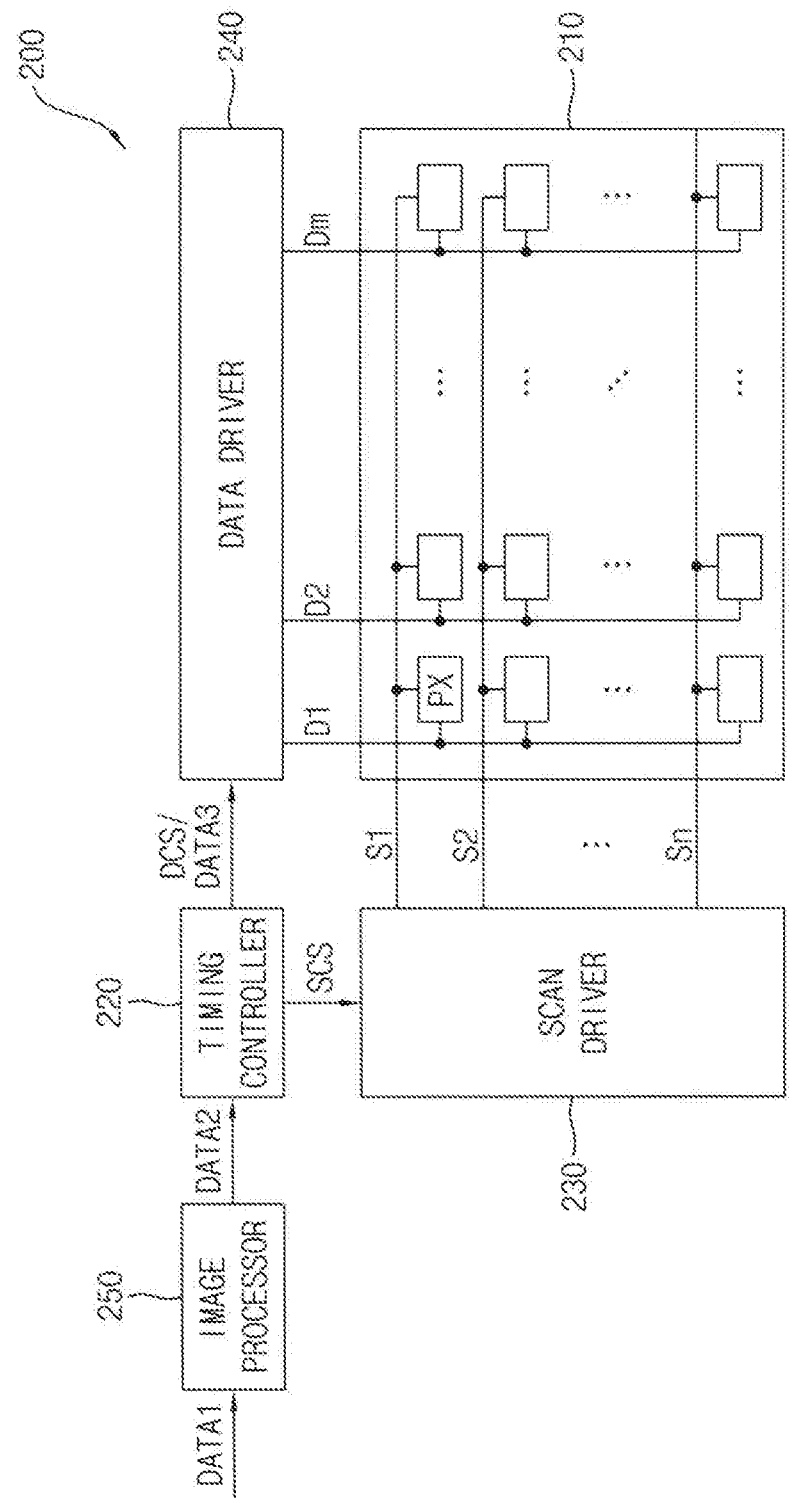
FIG. 2 is a block diagram illustrating an example of a display device included in the head mounted display device of FIG. 1.
Figure 3A:
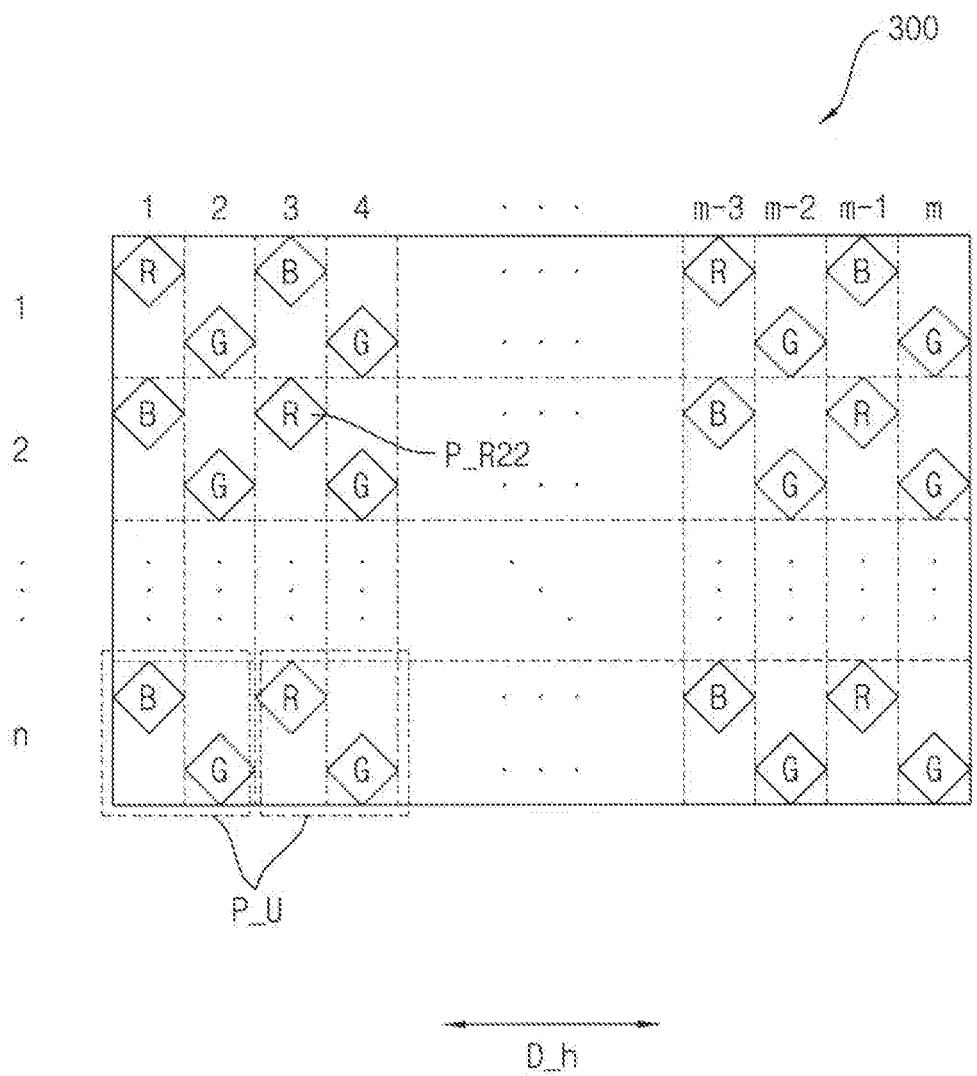
FIG. 3A is a diagram illustrating an example of a display panel included in the display device of FIG. 2.
Figure 3B:
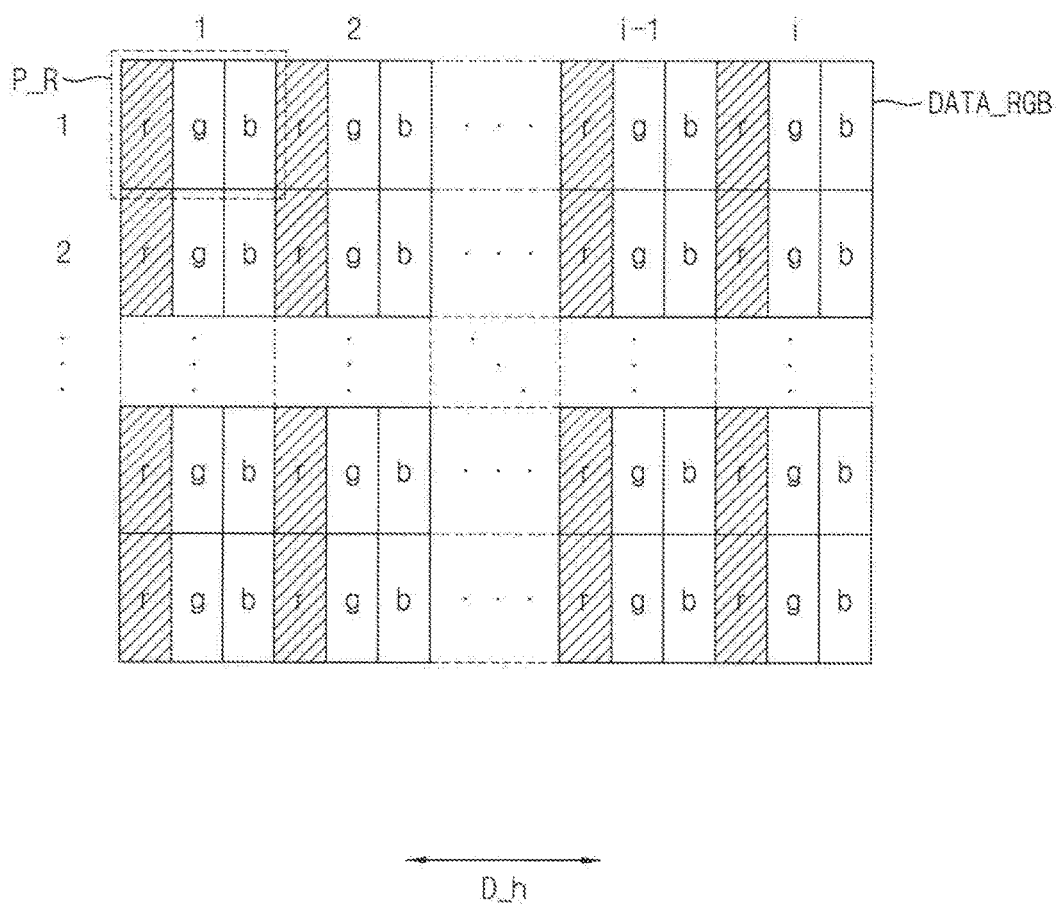
FIGS. 3B and 3C are diagrams illustrating an example of image data used in the display device of FIG. 2.
Figure 3C:
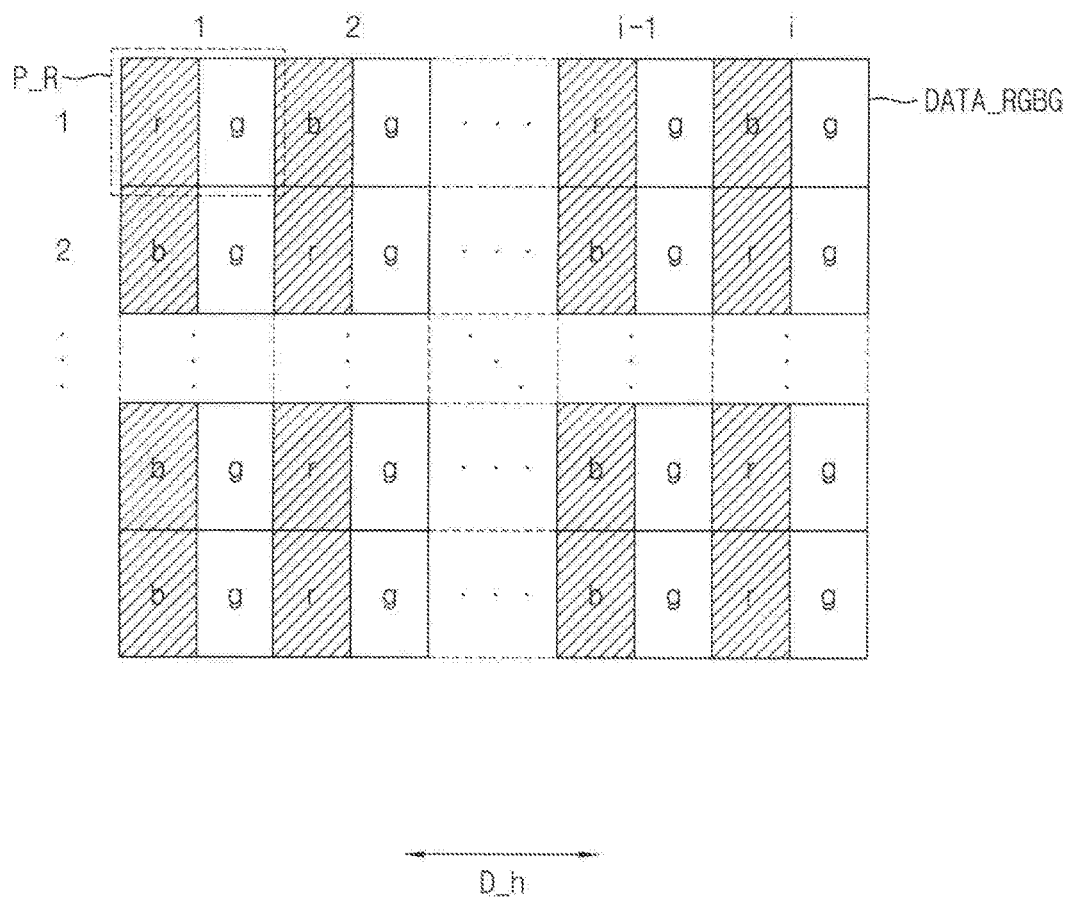

FIG. 2 is a block diagram illustrating an example of a display device 200 included in the head mounted display device 100 of FIG. 1. FIG. 3A is a diagram illustrating an example of a display panel included in the display device 200 of FIG. 2. FIGS. 3B and 3C are diagrams illustrating an example of image data used in the display device 200 of FIG. 2.

Referring to FIG. 2, the display device 200 may include a display panel 210, a timing controller 220, a scan driver 230, a data driver 240, and an image processor 250.

The display panel 210 may include scan lines 51 through Sn, data lines D1 through Dm, and a pixel PX, where each of n and m is an integer greater than or equal to 2. The pixel PX may be located in each of cross-regions of the scan lines 51 through Sn and the data lines D1 through Dm. The pixel PX may store a data signal (e.g., a data signal provided through the data lines D1 through Dm) in response to a scan signal (e.g., a scan signal provided through the scan lines 51 through Sn) and may emit a light based on the stored data signal.

The display panel 210 (or the pixel PX) may include a first sub-pixel R, a second sub-pixel and a third sub-pixel G Each of the first through third sub-pixels R, and B may emit light in a single color. For example, the first sub-pixel R (or a first type pixel) may emit light with a first color (e.g., a red color), the second sub-pixel G (or a second type pixel) may emit light with a second color (e.g., a green color), and the third sub-pixel B (or a third type pixel) may emit light with a third color (e.g., a blue color).

Referring to FIG. 3A, the first through third sub-pixels R, and B may be arranged in a Pentile form. For example, the first through third sub-pixels R, and B may be arranged in an RGBG format. As illustrated in FIG. 3A, the first sub-pixel R, the second sub-pixel the third sub-pixel B and the second sub-pixel G may be arranged in in a horizontal direction (D_h). Here, a unit pixel P_U may include the first sub-pixel R and the second sub-pixel or the unit pixel P_U may include the second sub-pixel G and the third sub-pixel B.

Referring again to FIG. 2, the timing controller 220 may receive converted data (e.g., second data DATA2) from the image processor 250 and may receive a control signal from an external device. Here, the control signal may include a horizontal synchronization signal, a vertical synchronization signal, and clock signals. The timing controller 220 may generate the data driving control signal DCS based on the horizontal synchronizing signal and the clock signal and may provide the data driving control signal DCS to the data driver 240. Here, the data driving control signal DCS may include a data start signal and a data clock signal. Similarly, the timing controller 220 may generate a scan driving control signal SCS based on the vertical synchronization signal and the clock signal and may provide the scan driving control signal SCS to the scan driver 230. Here, the scan driving control signal SCS may include the start pulse and the clock signals.

The scan driver 230 may generate the scan signal based on the scan driving control signal SCS. The scan driver 230 may include shift registers sequentially generating the scan signal based on the start signal and the clock signals.

The data driver 240 may generate the data signal in response to the data driving control signal DCS. The data driver 240 may convert the image data of a digital format (e.g., third data DATA3) into a data signal of an analog format. The data driver 240 may generate the data signal based on grayscale voltages (or gamma voltages) predetermined, where the grayscale voltages may be provided from a gamma circuit. The data driver 240 may sequentially provide the data signal to pixels included in a pixel column.

The image processing unit 250 may generate the converted data DATA2 by resizing (or by scaling) and by rendering (or by performing sub-pixel rendering) the image data (e.g., the first data DATA1) provided from an external device. Here, the image data may include left image data corresponding to the left eye of the user and right image data corresponding to the right eye of the user for providing images to both eyes of the user.

In some example embodiments, the image processor 250 may correct (or compensate) chromatic aberration (referred to as CA) of the image data (or an image corresponding to the image data) by resizing the image data by color. When the image (or light) displayed on the display device 110 passes through the lens 120 in the head mounted display device 100, the chromatic aberration may occur due to difference in refractive index depending on the wavelength of the image (or light).

In some example embodiments, the image processor 250 may generate and render data in a second format (e.g., an RGBG format) by rendering the image data in a first format (e.g., an RGB format). That is, the image processor 250 may reconstruct the image data of the first format into the render data of the second format. The second format may be predetermined based on arrangement form of the pixel PX (or pixels, sub-pixels) in the display panel 210. That is, the image processor 250 may render the image data of the first format suitable for the arrangement of the sub-pixels R, and B.

Referring to FIGS. 3B and 3C, the image data DATA_RGB of the first format may include a first type data value r, a second type data value g, and a third type data value b which are sequentially and repeatedly arranged in the horizontal direction (D_h). Here, the first type data value r may be a data value for a first pixel (e.g., the first sub-pixel R described with reference to FIG. 3A) emitting light with a first color, the second type data value g may be a data value for a second pixel (e.g., the second sub-pixel G) emitting light with a second color, and the third type data value b is a data value for a third pixel (e.g., the third sub-pixel B) emitting light with a third color. The image data DATA_RGB of the first format may include each of the first to third type data values corresponding to the unit pixel P_U described with reference to FIG. 3A.

The rendering data DATA_RGBG of the second format may include the data values corresponding to the pixel arrangement of the sub-pixels described with reference to FIG. 3A, for example, the rendering data DATA_RGBG may include the first type data value r, the second type data value g, the third type data value b, and the second type data value g sequentially arranged in horizontal direction (D_h) opposite to the first direction D1.

A configuration of generating rendering data will be described with reference to FIGS. 5A through 5F.

Figure 4:
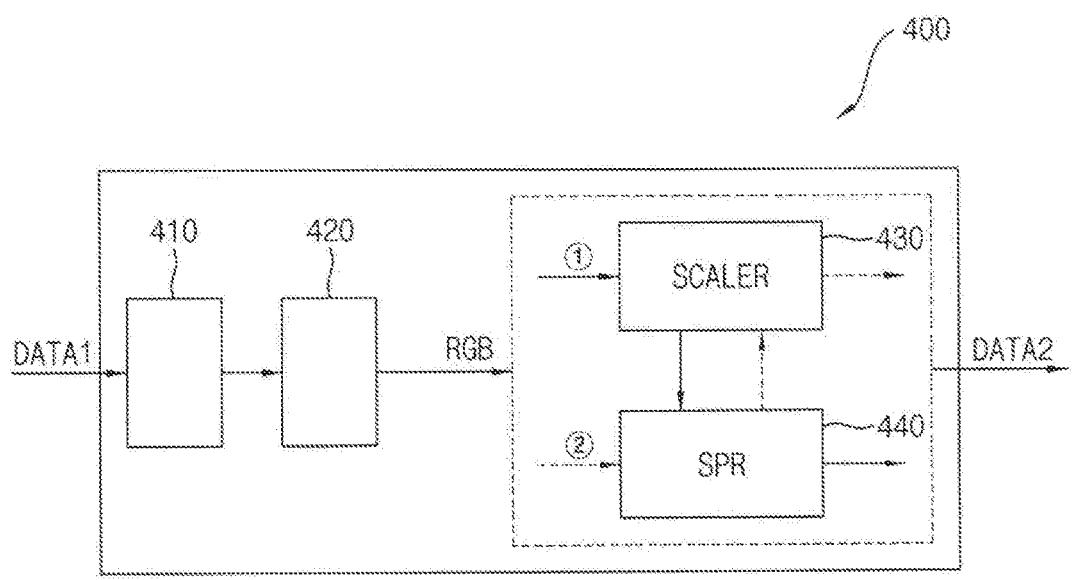
FIG. 4 is a diagram illustrating an example of image processor included in the display device of FIG. 2.

FIG. 4 is a diagram illustrating an example of an image processor 400 included in the display device 200 of FIG. 2.

Referring to FIG. 4, the image processor 400 may include a first scaling unit 410 (or an up-scaling unit), an edge enhancement unit 420, a second scaling unit 430 (or a scaling unit) and a rendering unit 440 (or a sub-pixel rendering unit; SPR unit).

The first scaling unit 410 may upscale the image data to be usable in the display panel 210. For example, the first scaling unit 410 may upscale the image data so that a resolution of the image data becomes to be equal to a resolution of the display panel 210. The first scaling unit 410 may upscale the image data in consideration of the arrangement of pixels in the display panel 210 (e.g., RGBG format, RGBWCY format, etc.).

The edge enhancement unit 420 may extract an edge (or a boundary) from the upscaled image data and may improve the edge. For example, the edge enhancement unit 420 may improve edges using general techniques such as a linear interpolation technique, a color edge enhancement technique, and the like.

The second scaling unit 430 may compensate (or correct) the chromatic aberration of first image data due to the lens 120 by scaling (or by resizing) the first image data with different ratios which are determined for each color. Here, the first image data may be edge enhanced image data provided from the edge enhancement unit 420 or rendering data provided from the rendering unit 440. That is, the second scaling unit 430 may compensate the chromatic aberration before rendering the image data or may compensate the chromatic aberration after rendering the image data. For example, the image processor 400 may resize and render the image data according to the solid line ① or the dotted line ② illustrated in FIG. 4.

In some example embodiments, the second scaling unit 430 may divide the first image data into partial image data, may generate partial converted data by respectively resizing the partial image data based on scaling variables, and may generate the converted data by combining the partial converted data. Here, the partial image data may correspond to the partial images constituting an image corresponding to the first image data, respectively. After describing the rendering unit 440, the second scaling unit 430 will be described in detail with reference to FIG. 7.

The rendering unit 440 may output the rendering data of the second format by rendering second image data of the first format (or data provided from the edge enhancement unit 420). The rendering unit 440 may calculate a target rendering data value based on data values in the image data corresponding to a first block of M*N (e.g., a block having M rows and N columns), where each M and N is an integer greater than or equal to 2. For example, the rendering unit 440 may calculate the target rendering value by weight-averaging the M*N data values (i.e., the data values corresponding to the first block of M*N) and may reconstruct the first image data of the first format into the rendering data of the second format. As described with reference to FIGS. 1, 3B and 3C, the first format may be a stripe format or the RGB format, and the second format may be the Pentile format or the RGBG format. The second image data may be the converted data provided from the second scaling unit 430 or edge enhanced image data provided from the edge enhancement unit 420. That is, the rendering unit 440 may perform rendering after chromatic aberration correction of the image data or may perform rendering before chromatic aberration correction of the image data.

In one example embodiment, the first block may have a size of 2*2. Here, the rendering unit 440 may calculate the target rendering data value of a target sub-pixel based on a target data value (i.e., the target data value included in the image data) corresponding to the target sub-pixel (or a specific sub-pixel, a specific pixel) and three adjacent data values which are adjacent to the target data value (i.e., adjacent data values corresponding to three adjacent sub-pixels adjacent to the target sub-pixel).

In an example embodiment, the rendering unit 440 may render the image data using a first sub-filter (or first sub-rendering filter) having a weight for each of the data values corresponding to the first block.

Figure 5A:
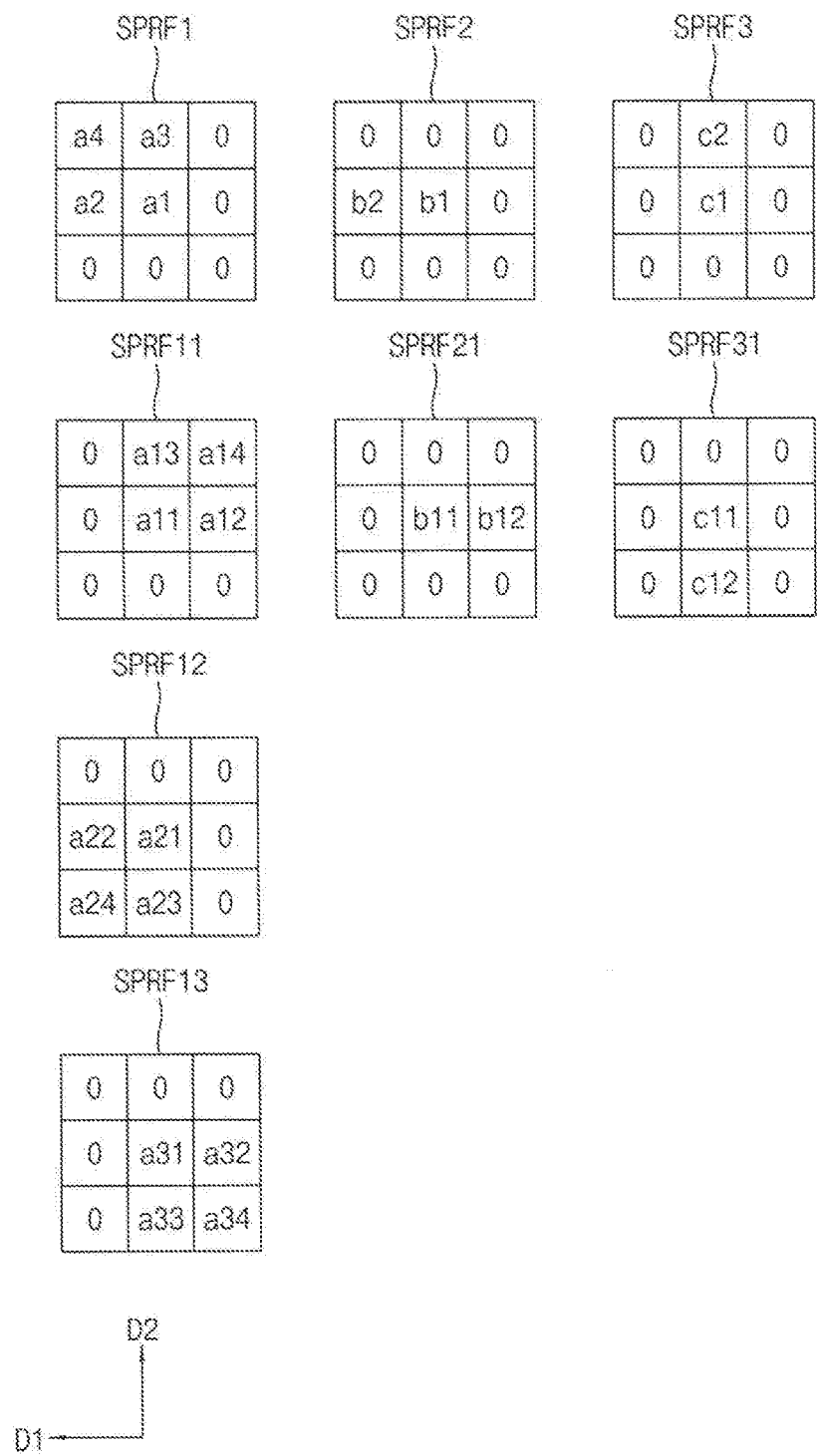
FIG. 5A is a diagram illustrating examples of sub filters used in a rendering unit included in the image processor of FIG. 4.

FIG. 5A is a diagram illustrating examples of sub filters used in a rendering unit included in the image processor of FIG. 4. FIGS. 5B through 5F are a diagram illustrating an example of rendering process using the sub filters of FIG. 5A.

Referring to FIG. 5A, the first sub-filter SPRF1 may include a first weight a1 for the target data value among the data values, a second weight a2 for a first adjacent data value which is adjacent to the target data value in the first direction D1 (e.g., in a horizontal direction), a third weight a3 for a second adjacent data value which is adjacent to the target data value in the second direction D2 (e.g., in a vertical direction), and a fourth weight a4 for a third adjacent data value which is adjacent to the second adjacent data value in the first direction D1 (or a third adjacent data value which is adjacent to the first adjacent data value in the second direction D2).

For example, the first sub-filter SPRF1 may include weight values a1, a2, a3, and a4 for the target pixel (or the target data value) and adjacent pixels (or the adjacent data values) which are located to the left side, the upper side and the upper left side of the target pixel. Here, the sum of the weight values a1, a2, a3 and a4 may be 1, for example, each of the weight values a1, a2, a3 and a4 may be ¼.

The first sub-filter SPRF1 shown in FIG. 5A is an example. The first sub-filter SPRF1 is not limited thereto. The first sub-filter SPRF1 is represented by one or more of 11th, 12th, 13th sub-filter SPRF11, 12, 13 as described below in other embodiments. For example, the 11th sub-filter SPRF11 illustrated in FIG. 5A may include weight values a11, a12, a13, and a14 for the target pixel and adjacent pixels which are located to the right side, the upper side and the upper right side of the target pixel, and the weight values a11, a12, a13 and a14 may be equal to each other or different from each other. For example, the 12th sub-filter SPRF12 illustrated in FIG. 5A may include weight values a21, a22, a23, and a24 for the target pixel and adjacent pixels which are located to the left side, the lower side and the lower left side of the target pixel. For example, the 13th sub-filter SPRF13 illustrated in FIG. 5A may include weight values a31, a32, a33, and a34 for the target pixel and adjacent pixels which are located to the right side, the lower side and the lower right side of the target pixel.

A second sub-filter SPRF2 may include a 21th weight b1 for the target data value among the data values and a 22nd weight b2 for a first adjacent data value which is adjacent to the target data value in the first direction D1. For example, the second sub-filter SPRF2 may have weight values b1 and b2 respectively for the target pixel (or the target data value) and an adjacent pixel located on the left side of the target pixel. Here, the sum of the weight values b1 and b2 may be 1, for example, each of the weight values b1 and b2 may be ½.

The second sub-filter SPRF2 shown in FIG. 5A is an example. However, the second sub-filter SPRF2 is not limited thereto. The second sub-filter SPRF2 is represented by a 21st sub-filter SPRF21 as described below in another embodiment. For example, the 21st sub-filter SPRF21 may include weight values b11 and b12 for the target pixel (or the target data value) and an adjacent pixel located on the right side of the target pixel. Here, the weight values b11 and b12 may be equal to or different from each other.

A third sub-filter SPRF3 may include a 31st weight c1 for the target data value among the data values and a 32nd weight c2 for a second adjacent data value which is adjacent to the target data value in the second direction D2. For example, the third sub-filter SPRF3 may have weight values c1 and c2 respectively for the target pixel (or the target data value) and an adjacent pixel located on the upper side of the target pixel. Here, the sum of the weight values c1 and c2 may be 1, for example, each of the weight values c1 and c2 may be ½.

The third sub-filter SPRF3 shown in FIG. 5A is an example. However, the third sub-filter SPRF3 is not limited thereto. The third sub-filter SPRF3 is represented by a 31st sub-filter SPRF31 as described below in another embodiment. For example, the 31st sub-filter SPRF31 may include weight values c11 and c12 for the target pixel (or the target data value) and an adjacent pixel located on the lower side of the target pixel. Here, the weight values c11 and c12 may be equal to or different from each other.

Hereinafter, a rendering result using the first sub-filter SPRF1 and a rendering result using the second sub-filter SPRF2 (or using the third sub-filter SPRF3) will be described.

Referring to FIGS. 3B, 3C, 5A, and 5B, the rendering unit 440 may render image data using the second sub-filter SPRF2.

When the image data has the RGB format described with reference to FIG. 3B, the image data may include first color data DATA_R for first sub-pixels, second color data DATA_G for second sub-pixels, and third color data DATA_B for third sub-pixels. Here, the first sub-pixels may emit red light, and the first color data DATA_R may be red data. The second sub-pixels may emit green light, and the second color data DATA_G may be green data. The third sub-pixels may emit blue light, and the third color data DATA_B may be blue data. First color data values and third color data values respectively included in the first color data DATA_R and the third color data DATA_B do not correspond to the first sub-pixel R and the third sub-pixel B included in the display panel 300 of FIG. 3A. Accordingly, the rendering unit 440 may render the first color data DATA_R and the third color data DATA_B according to the arrangement of the sub-pixels shown in FIG. 3A (i.e., the RGBG format). Because the second color data values included in the second color data DATA_G correspond one-to-one to the second sub-pixel G included in the display panel 300 of FIG. 3A, the second color data DATA_G may not be rendered.

When the rendering unit 440 renders the first color data DATA_R using the second sub-filter SPRF2, the rendering unit 440 may calculate the target rendering data value by weight-averaging the target data value and the first adjacent data value which is adjacent to the target data value in the first direction D1 among the second data values. For example, the rendering unit 440 may calculate a 22nd rendering data value R22 for a 22nd sub-pixel P_R22 illustrated in FIG. 3A by weight-averaging a 21st data value r21 and a 22nd data value r22. That is, the rendering unit 440 may generate the first color rendering data by weighting averaging the data values respectively corresponding to the first sub-pixels R. Similarly, the rendering unit 440 may also generate third color rendering data by weight-averaging the data values respectively corresponding to the third sub-pixels B. Here, the rendering data finally output from the rendering unit 440 may include first color rendering data, second color rendering data (or the second color data), and third color rendering data.

Figure 5B:
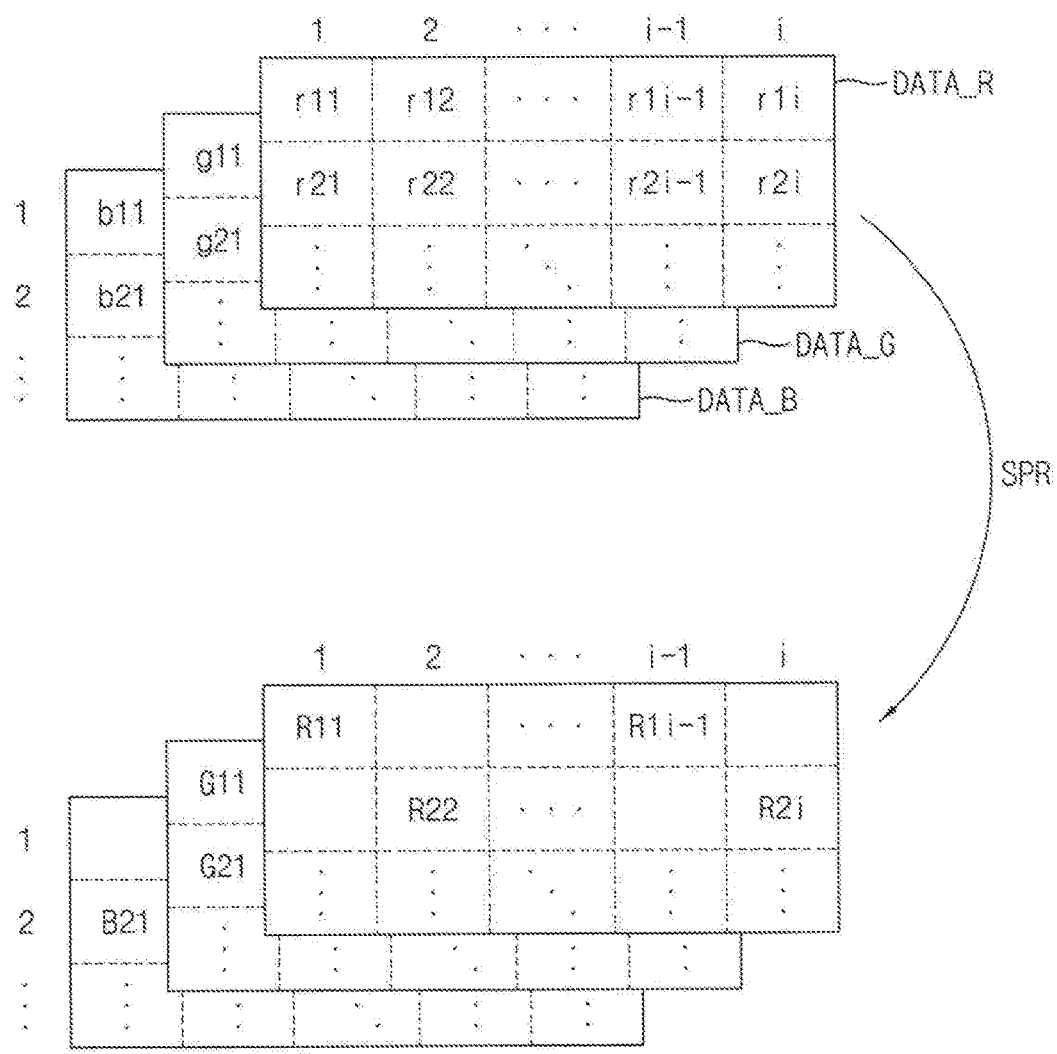
Figure 5C:
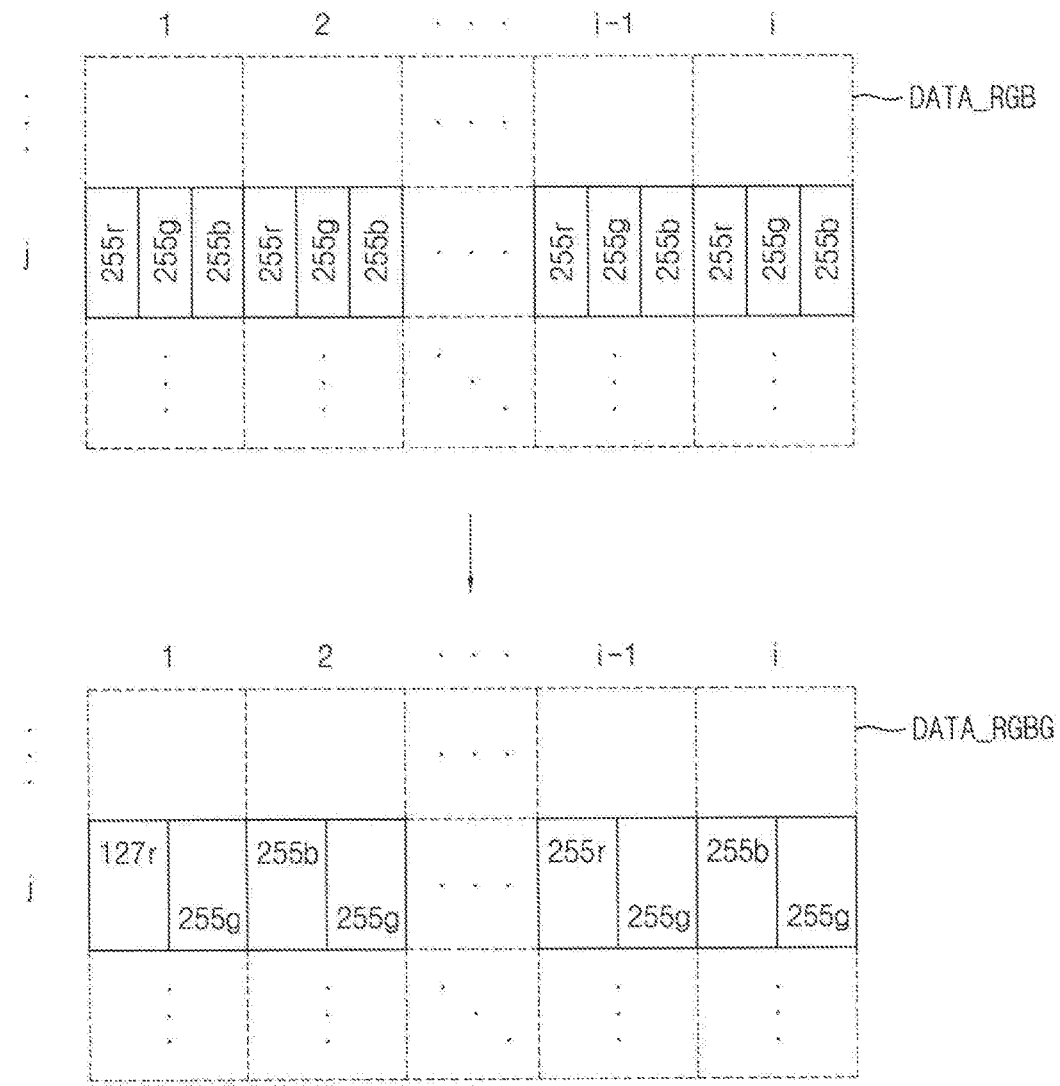
Figure 5D:
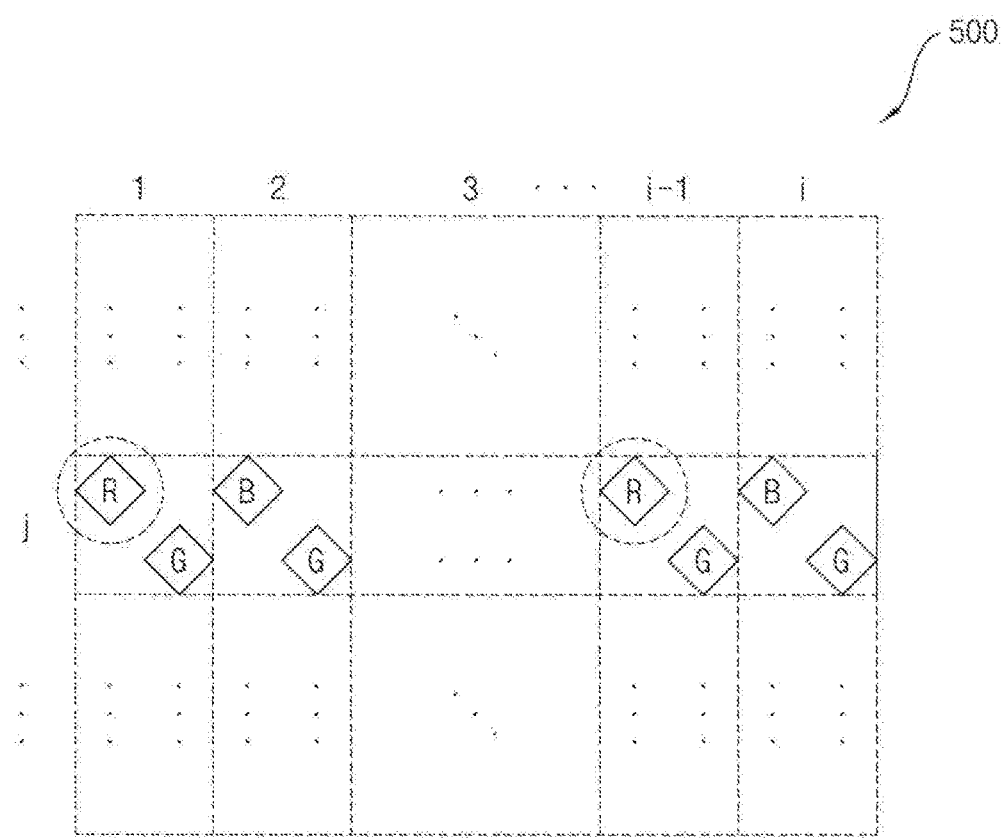

For example, with reference to FIG. 5C, when it is desired to display an image having only one line in a row, the image data DATA_RGB may include valid data values only in a j-th row (e.g., grayscale value of 255, or first through third data values 255r, 255g, and 225b). When the rendering unit 440 renders the image data DATA_RGB using the second sub-filter SPRF2, the rendering data DATA_RGBG may include valid data values only in the jth row (e.g., a first data value of 127 grayscale value 127r, and the first through third data values 255r, 255g, and 225b). Therefore, as illustrated in FIG. 5D, only the sub-pixels R, and B located in the j-th row may emit light. Here, when the image displayed on the display panel 500 is enlarged through the lens 120 illustrated in FIG. 1, the line corresponding to the jth row may be seen for the user to be divided into the first color, the second color, and the third color.

The rendering unit 440 may prevent a phenomenon that the colors are visually distinguished from each other at the line (or at an edge of an object) by rendering the image data using the first sub-filter SPRF1.

Figure 5E:
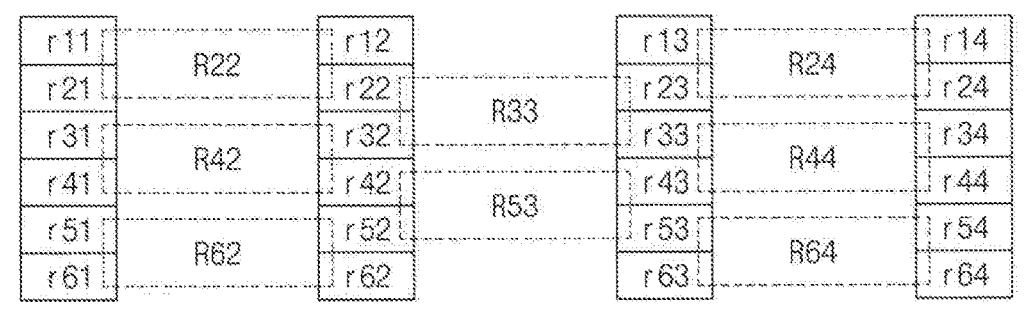

Referring to FIGS. 5A, 5B and 5E, the rendering unit 440 may render the image data using the first sub-filter SPRF1.

When the rendering unit 440 renders the first color data DATA_R using the first sub-filter SPRF1, the rendering unit 440 may generate the target rendering data value by weight-averaging the target data value, a first adjacent data value which is adjacent to the target data value in the first direction D1, a second adjacent data value which is adjacent to the target data value in the second direction D2, and a third adjacent data value which is adjacent to the second adjacent data value in the first direction D1. For example, the rendering unit 440 may calculate the 22nd rendering data value R22 for the 22nd sub-pixel P_R22 by weight-averaging a 21st data value r21, a 22nd data value r22, a 11th data value r11, and a 12th data value r12.

As illustrated in FIG. 5E, the rendering unit 440 may generate the first color rendering data by weight-averaging the data values respectively corresponding to the first sub-pixels R. In addition, the rendering unit 440 may generate the third color rendering data by weight-averaging the data values respectively corresponding to the third sub-pixels B. Here, the rendering data finally output from the rendering unit 440 may include the first color rendering data, second color rendering data (or the second color data), and the third color rendering data.

Figure 5F:
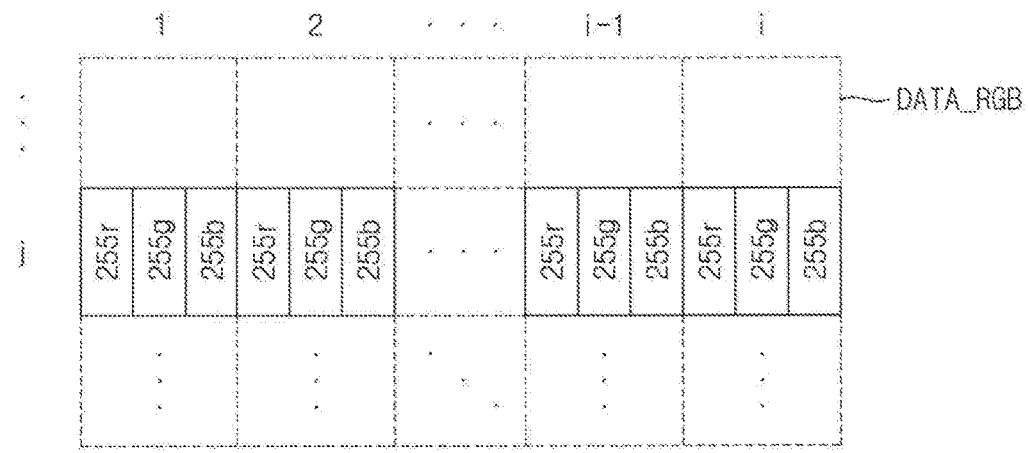
Figure 5F:
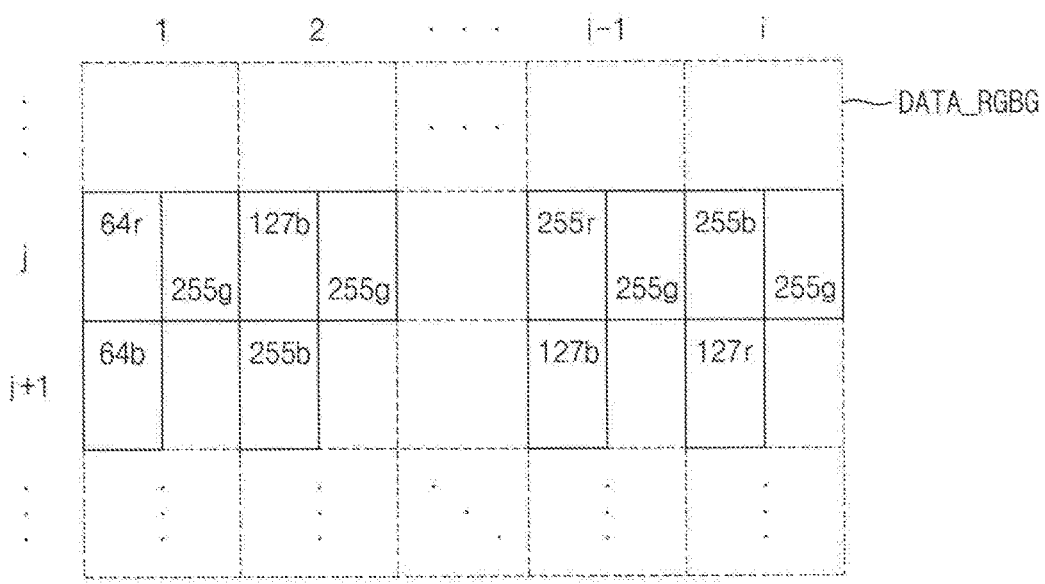

For example, with reference to FIG. 5F, when it is desired to display an image having only one line in a row, the image data DATA_RGB may include valid data values only in a j-th row (e.g., grayscale value of 255). When the rendering unit 440 renders the image data DATA_RGB using the first sub-filter SPRF1, the rendering data DATA_RGBG may include valid data values in the jth row (e.g., a first data value of 127 grayscale value 64r, the first and third data values of 127 grayscale value 127r and 127b, and a third data value of 255 grayscale value 255g) and may include valid data values in a j+1th row (e.g., a third data value of 127 grayscale value 64b and the first and third data values of 127 grayscale value 127r and 127b).

Therefore, the sub pixels R, and B located in the jth row and the sub pixels R, and B located on the j+1th row may emit light. The first sub-pixel R in the jth row may emit light in response to an average data value (e.g., a grayscale value of 127) which is calculated by weight-averaging a valid data value (e.g., a grayscale value of 255) corresponding to the jth row and an invalid data value (e.g., a grayscale value of 0) corresponding to the j−1th row. Similarly, the first sub-pixel R in the j+1th row may emit light in response to an average data value (e.g., a grayscale value of 127) which is calculated by weight-averaging an invalid data value (e.g., a grayscale value of 0) corresponding to the j+1th row and a valid data value (e.g., a grayscale value of 255) corresponding to the jth row.

Here, even when the image displayed on the display panel 500 is enlarged through the lens 120 illustrated in FIG. 1, intensity of the first color and intensity of the third color may be reduce compared with intensity of the first color and intensity of the third color by the second sub-filter SPRF2, and the first color and the third color adjacent to the upper, lower, left, and right sides may be mixed. Therefore, the phenomenon that the first through third colors are visible to the user may be prevented (or reduced).

As described with reference to FIGS. 5A through 5F, the display device 200 (or the image processor 250, or the rendering unit 440) according to example embodiments may render the image data using the first sub-filter SPRF1 having weights for each of the data values corresponding to the first block (e.g., a block of 2*2). Therefore, it is possible to prevent or reduce the phenomenon that the colors are recognized visually at a line in the image (or at an edge of an object).

Figure 6A:
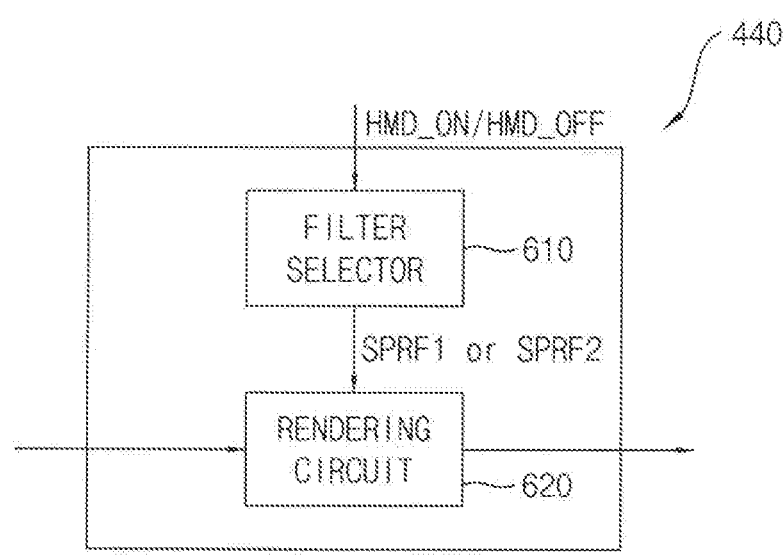
FIG. 6A is a diagram illustrating an example of a rendering unit included in the image processor of FIG. 4.

FIG. 6A is a diagram illustrating an example of a rendering unit 440 included in the image processor 400 of FIG. 4.

Referring to FIG. 6A, the rendering unit 440 may include a filter selector 610 and a rendering circuit 620.

The filter selector 610 may select a horizontal filter or a horizontal vertical filter. Here, the horizontal filter has a 21th weight value for the target pixel (or a first target data value) and a 22nd weight value for the first adjacent pixel (or the first adjacent data value) which is adjacent to the target pixel in the first direction (or in the horizontal direction, on the left side of the target pixel) and may be substantially the same as the second sub-filter SPRF2 described with reference to FIG. 5A. The horizontal vertical filters may include a first weight for the target pixel (or the first target data value), a second weight for a first adjacent pixel which is adjacent to the target pixel in the first direction (e.g., in a horizontal direction, on the left side of the target pixel), a third weight for a second adjacent pixel which is adjacent to the target pixel in the second direction (e.g., in a vertical direction, on the upper side of the target pixel), and a fourth weight for a third adjacent pixel which is adjacent to the target pixel in the first and second directions (or in a diagonal direction, on the left upper side of the target pixel) and may be substantially the same as the first sub-filter SPRF1 described with reference to FIG. 5A.

The rendering circuit 620 may render the image data using a filter selected by the filter selector 610 (e.g., the horizontal filter or the horizontal vertical filter). An operation of the rendering circuit 620 may be substantially the same as an operation of the rendering unit 440 described with reference to FIG. 5B. Therefore, duplicated description will not be repeated.

In some example embodiments, the rendering unit 440 may operate in a normal mode or a wearable mode.

For example, when the display device 200 is implemented as a smart phone and when the display device 200 is not mounted in the head-mounted display device 100, the rendering unit 440 may operate in the normal mode. Here, a first mode selection signal HMD_OFF corresponding to the normal mode may be provided from the external device to the display device 200 because the image is not enlarged through the lens 120. The filter selector 610 may select the horizontal filter in the normal mode based on the first mode selection signal HMD_OFF, and the rendering circuit 620 may perform rendering the image data using the horizontal filter (e.g., the second sub-filter SPRF2). Therefore, a load of the display device 200 may be relatively reduced.

For example, when the display device 200 is mounted in the head-mounted display device 100, the rendering unit 440 may operate in the wearable mode. Here, a second mode selection signal HMD_ON corresponding to the wearable mode may be provided from the external device to the display device 200 because the image is enlarged through the lens 120.

The filter selector 610 may select the horizontal vertical filter in the wearable mode based on the second mode selection signal HMD_ON, and the rendering circuit 620 may perform rendering the image data using the horizontal vertical filter (e.g., the first sub-filter SPRF1). Therefore, the phenomenon that the colors are visible to the user at edges of objects in an image is reduced or eliminated.

As described with reference to FIG. 6A, when the display device 200 is implemented as a smart phone and is not mounted on the head mounted display device 100, the rendering unit 440 may reduce the load of the display device 200 by rendering the image data using the horizontal filter. In addition, when the display device 200 is mounted on the head-mounted display device 100, the rendering unit 440 may reduce the phenomenon that the colors are visible to the user at edges of the objects in the image by rendering the image data using the horizontal vertical filter.

Figure 6B:
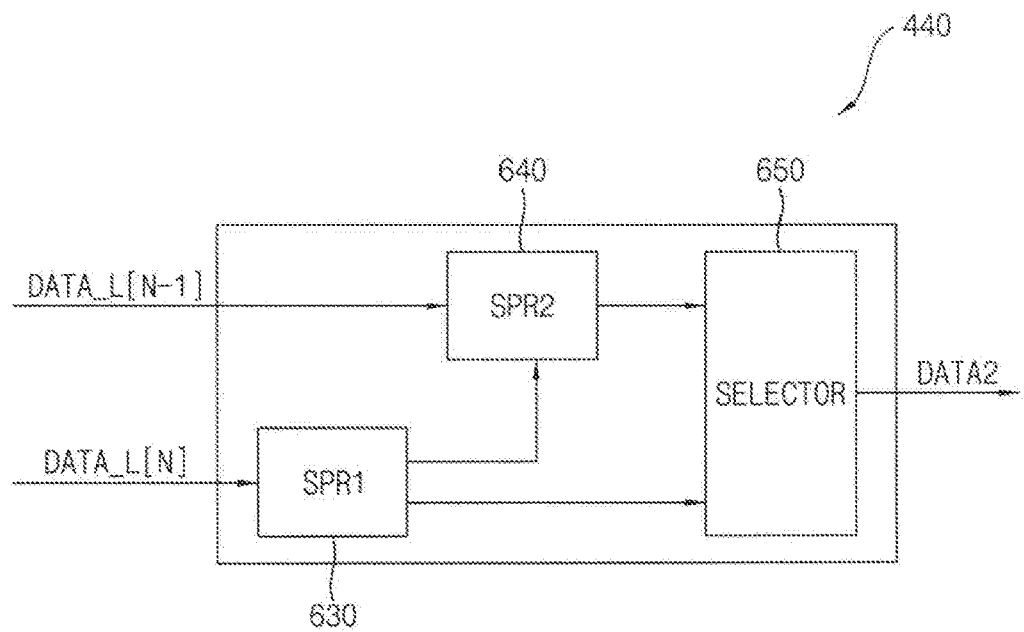
FIG. 6B is a diagram illustrating an example of a rendering unit included in the image processor of FIG. 4.
Figure 6C:
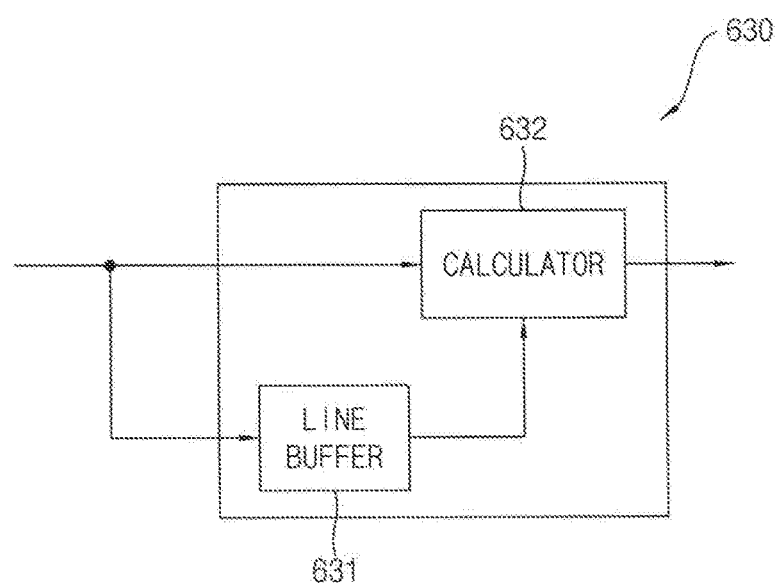
FIG. 6C is a diagram illustrating an example of a first sub rendering circuit included in the rendering unit of FIG. 6B.
Figure 6D:
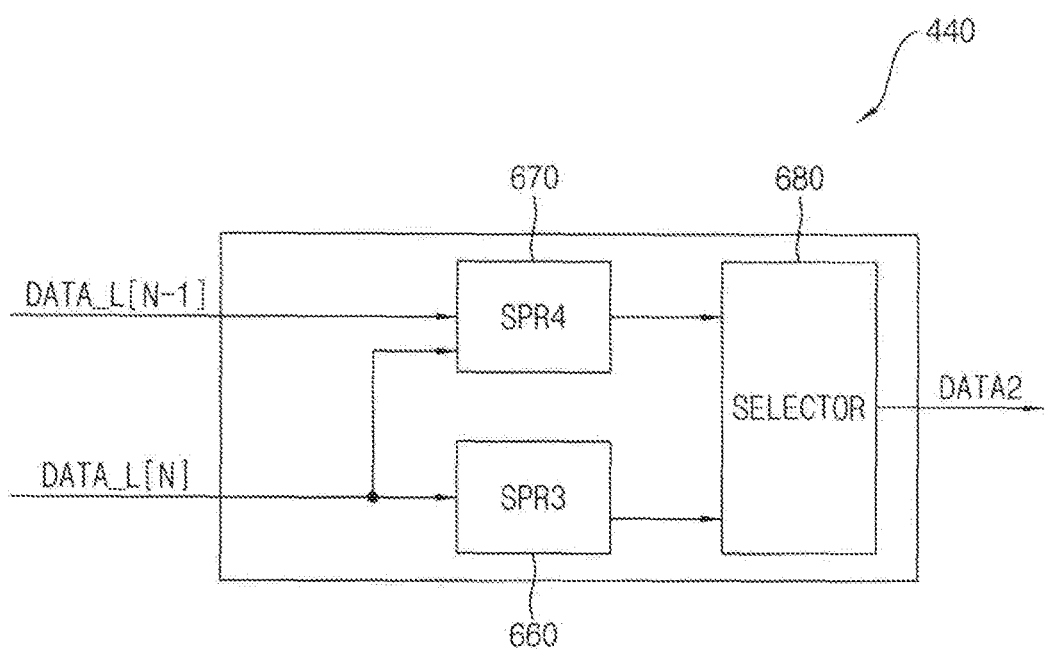
FIG. 6D is a diagram illustrating an example of a rendering unit included in the image processor of FIG. 4.

FIG. 6B is a diagram illustrating an example of a rendering unit 440 included in the image processor 400 of FIG. 4. FIG. 6C is a diagram illustrating an example of a first sub-rendering circuit 630 included in the rendering unit 440 of FIG. 6B. FIG. 6D is a diagram illustrating an example of a rendering unit 440 included in the image processor 400 of FIG. 4.

Referring to FIG. 6B, the rendering unit 440 may include the first sub-rendering circuit 630, a second sub-rendering circuit 640, and a first selector 650.

The first sub-rendering circuit 630 may output the first sub-rendering data by rendering the image data using the horizontal filter. Here, the horizontal filter may be substantially the same as the second sub-filter SPRF2 described with reference to FIG. 5A. An operation of the first sub-rendering circuit 630 may be substantially the same as the operation of the rendering unit 440 described with reference to FIG. 5B. Therefore, duplicated description will not be repeated.

The second sub-rendering circuit 640 may output second sub-rendering data by rendering first sub-rendering data using the vertical filter. The vertical filter may include a 31st weight c1 for the target pixel (or the target data value) and a 32nd weight c2 for a second adjacent pixel which is adjacent to the target pixel in the second direction (or in the vertical direction, on the upper side of the target pixel) and may be substantially the same as the third sub-filter SPRF3 described with reference to FIG. 5A.

The second sub-rendering data generated by rendering the image data sequentially using the horizontal filter and the vertical filter may be substantially the same as the rendering data generated by rendering the image data using the first sub-filter SPRF1 described with reference to FIG. 5A, as shown in Equation 1 below.

[Equation 1]

$$R12\_R2 = 1/2 * (R11 + R12) \quad (1)$$

$$R22\_R2 = 1/2 * (R21 + R22) \quad (2)$$

$$\begin{aligned} R22\_R3 &= 1/2 * (R12\_R1 + R22\_R1) \quad (3)\\ &= 1/2 * (1/2 * (R11 + R12) + 1/2 * (R21 + R22))\\ &= 1/4 * (R11 + R12) + 1/4 * (R21 + R22)\\ &= R22\_R1 \end{aligned}$$

Here, R12_R2 and R22_R2 denote rendering data values of the 12th and 22nd sub-pixels (e.g., a 12th and 22nd sub-pixels illustrated in FIG. 5B) generated based on the horizontal filter (e.g., the second sub-filter SPRF2 illustrated in FIG. 5A). R11, R12, R21 and R22 denote data values corresponding to the 22nd sub-pixel P_R22, and R22_R3. R22_R3 denotes a rendering data value of the 22nd sub-pixel generated based on the vertical filter (e.g., the third sub-filter SPRF3 illustrated in FIG. 5A). R12_R1 denotes a rendering data value of the 12nd sub-pixel generated based on the first sub-filter SPRF1 illustrated in FIG. 5A. R22_R1 denotes a rendering data value of the 22nd sub-pixel generated based on the first sub-filter SPRF1 illustrated in FIG. 5A.

The first selector 650 may select and output one of the first sub-rendering data and the second sub-rendering data.

In some example embodiments, the rendering unit 440 may operate in the normal mode or in the wearable mode. As described with reference to FIG. 6A, when the display device 200 is implemented as a smart phone and is not mounted in the head mounted display device 100, the rendering unit 440 may operate in the normal mode. That is, because the image is not enlarged through the lens 120, the rendering unit 440 may render the image data using the first sub-rendering circuit 630 (or a horizontal filter, e.g., the second sub-filter SPRF2) and may output the first sub-rendering data through the first selector 650. Therefore, the load of the display device 200 may be reduced.

For example, when the display device 200 is mounted on the head mounted display device 100, the rendering unit 440 may operate in the wearable mode. That is, because the image is enlarged through the lens 120, the rendering unit 440 may render the image data using the first sub-rendering circuit 630 and the second sub-rendering circuit 640 (or using sequentially the second sub-filter SPRF2 and the third sub-filter SPRF3) and may output the second sub-rendering data through the first selector 650. Therefore, the phenomenon that the colors are visible to the user at edges of objects in the image may be reduced.

Referring to FIG. 6C, the first sub-rendering circuit 630 may include a first line buffer 631 and a first calculator 632 (or a first operator).

The first line buffer 631 may store a first target data value (or data values corresponding to a line including the target pixel) and a first adjacent data value (or data values corresponding to a line including the adjacent pixel adjacent to the target pixel). For example, the first line buffer 631 may be a two line memory (e.g., a memory that stores data of two lines).

The first calculator 632 may weight-average the first object data value and the first adjacent data value and may output a result of weight-averaging.

Similarly, the second sub-rendering circuit 640 may include a second line buffer and a second calculator.

The second line buffer may store a second target data value (or the data values corresponding to the line including the target pixel) and a second adjacent data value (or data values corresponding to the line including the adjacent pixel adjacent to the target pixel). For example, the second line buffer may be a ⅙ line memory (e.g., a memory that stores data of ⅙ line). The first rendering data is reduced to ½ of the image data by the first sub-rendering circuit 630, so that the size of the second line buffer may be or be less than ½ of a size of the first line buffer 631.

For reference, one rendering unit may require a four-line buffer to calculate one rendering data value based on four data values. Alternatively, a rendering unit including two sequentially connected sub-rendering circuits may calculate one rendering data value based on four data values using only a three-line buffer. That is, the rendering unit 440 according to example embodiments may include the first and second sub-rendering circuits 630 and 640 sequentially connected, thereby may reduce manufacturing cost.

Similar to the first calculator 632, the second calculator may weight-average a second target data value and a second adjacent data value and may output a result of weight-averaging.

Referring to FIG. 6D, the rendering unit 440 may include a third sub-rendering circuit 660, a fourth sub-rendering circuit 670, and a second selector 680.

The third sub-rendering circuit 660 may output third sub-rendering data by rendering the image data using the horizontal filter and may be substantially the same as the first sub-rendering circuit 630 described with reference to FIG. 6B. The third sub-rendering data may be substantially the same as the first sub-rendering data described with reference to FIG. 6B.

The fourth sub-rendering circuit 670 may output fourth sub-rendering data by rendering the image data using the horizontal vertical filter. Here, the vertical horizontal filter may be substantially the same as the first sub-filter SPRF1 described with reference to FIG. 5A.

As described with reference to Equation 1, the fourth sub-rendering data generated using the horizontal vertical filter (e.g., the first sub-filter SPRF1) may be substantially the same as the second sub-rendering data described with reference to FIG. 6B. The second selector 680 may be substantially the same as the first selector 650 described with reference to FIG. 6B and may output the third sub-rendering data or the fourth sub-rendering data.

As described with reference to FIG. 6B, the rendering unit 440 may operate in the normal mode or in the wearable mode. Here, the second selector 680 may output the third sub-rendering data in the normal mode and may output the fourth sub-rendering data in the wearable mode.

As described with reference to FIGS. 6B through 6D, the rendering unit 440 may generate the first sub-rendering data (or the third sub-rendering data) using the first sub-rendering circuit 630 (or using the third sub-rendering circuit 660), may generate the second sub-rendering data (or the fourth sub-rendering data) using the second sub-rendering circuit 640 (or using the fourth sub-rendering circuit 670), and may output the first sub-rendering data or the second sub-rendering data. Particularly, when the display device 200 is implemented as a smart phone and is not mounted on the head-mounted display device 100, the load of the display device 200 may be reduced by outputting the first sub-rendering data. In addition, when the display device 200 is mounted on the head-mounted display device 100, the phenomenon that the colors are visible to the user at edges of objects in the image may be reduced.

Figure 7:
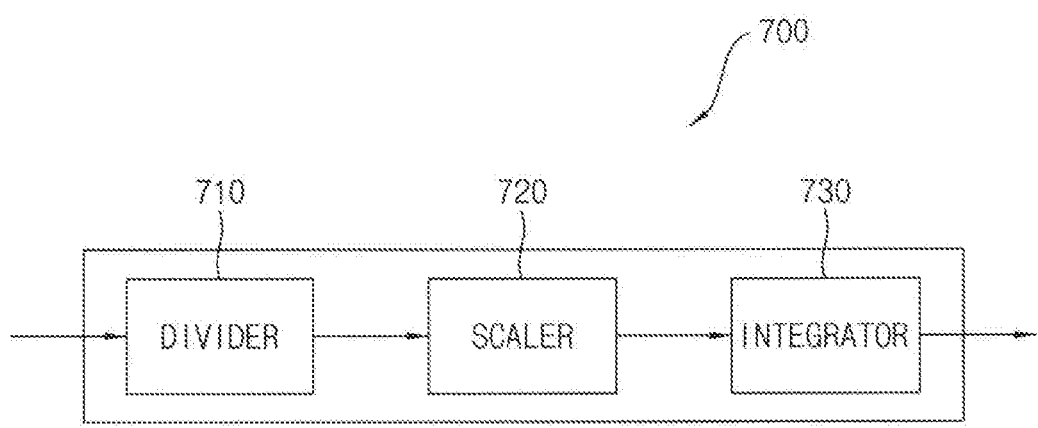
FIG. 7 is a diagram illustrating an example of a second scaling unit included in the image processor of FIG. 4.
Figure 8B:
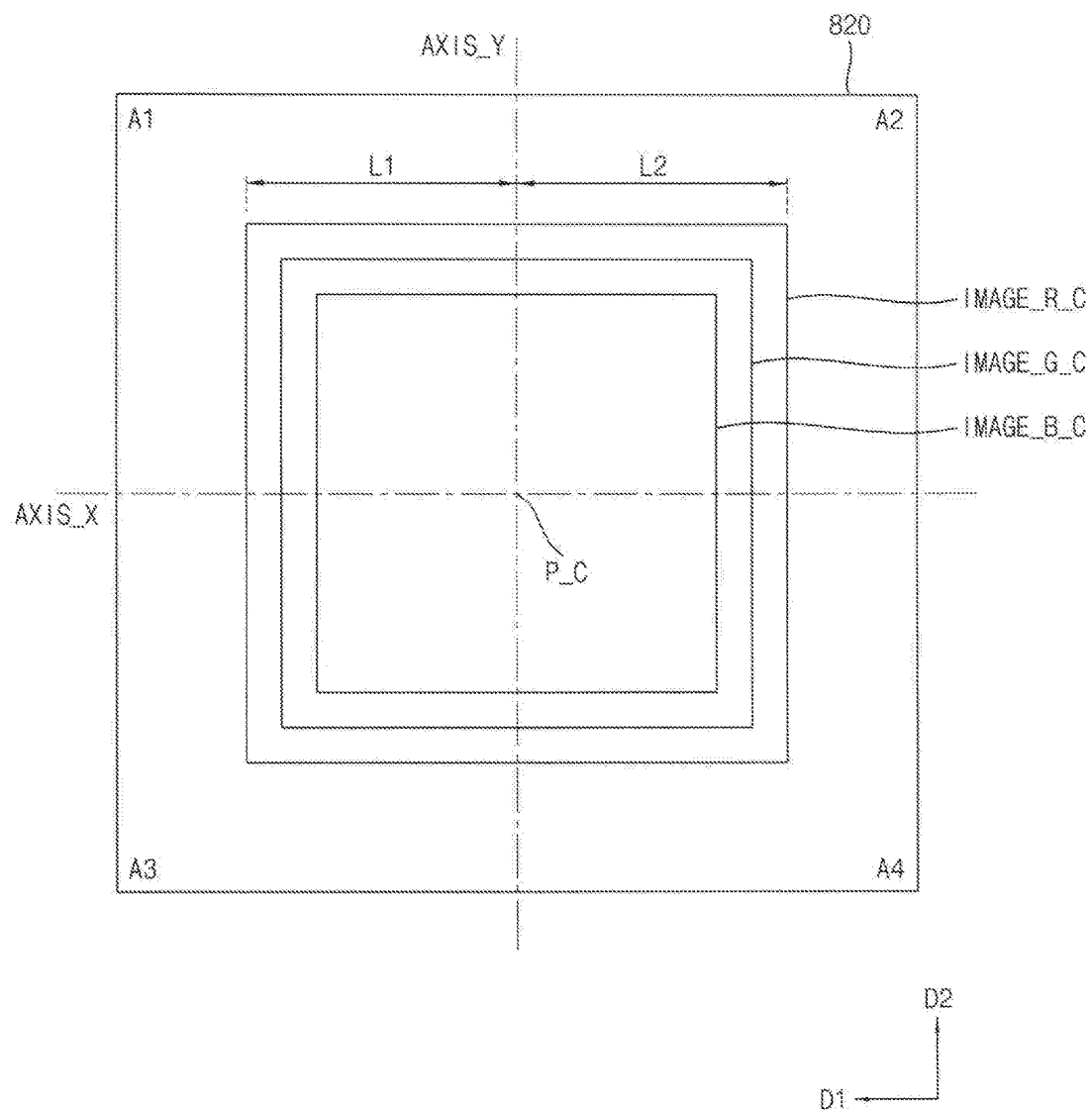
FIG. 8B is a diagram illustrating a comparative example of converted data generated by the second scaling unit of FIG. 7.

FIG. 7 is a diagram illustrating an example of a second scaling unit 700 included in the image processor 400 of FIG. 4. FIG. 8A is a diagram illustrating a chromatic aberration. FIG. 8B is a diagram illustrating a comparative example of converted data generated by the second scaling unit 700 of FIG. 7.

Referring to FIG. 8A, a light (or an image) displayed on the display panel 210 may be provided to the user through the lens 120. The chromatic aberration is caused by the difference in the refractive index depending on the wavelength of the light. As illustrated in FIG. 8A, a focal point of a first light R having a relatively short wavelength may be formed at a point farther than a focal point of the third light B having a relatively long wavelength with respect to the lens 120. That is, the first light R may correspond to a pixel located relatively close to a reference point (e.g., a point corresponding to the user's visual axis AXIS_C) on the display panel 210, and the third light B may correspond to a pixel located relatively far from the reference point. Therefore, the chromatic aberration may be compensated or removed by respectively scaling a first color image (e.g., a red image), a second color image (e.g., a green image), and a third color image (e.g., a blue image) (or removed) with different rates.

Referring to FIGS. 4 and 8B, the second scaling unit 700 may display a first color comparison image IMAGE_R_C by upscaling the first color data (e.g., the red data included in the image data) and may display a third color comparison image IMAGE_B_C by downscaling the third color data (e.g., the blue data included in the image data). In addition, the second scaling unit 700 may display the second color comparison image IMAGE_G_C by directly using the second color data (e.g., the green data included in the image data).

The second scaling unit 700 may scale the image data by applying the same scaling rate to all directions based on the reference point P_C. Here, the reference point P_C may correspond to the visual axis AXIS_C of the user illustrated in FIG. 8A.

For example, the second scaling unit 700 may display the first comparison image IMAGE_R_C by scaling (or resizing) the first color data by 1.006 times in the up, down, left, and right directions. Therefore, when the first color data is symmetrical in the first direction D1 and the second direction D2 with respect to the reference point P_C (e.g., when the sizes of the partial images displayed on areas A1 through A4 classified based on a first axis AXIS_X and a second axis AXIS_Y are the same or when the partial images are mutually symmetric), distances L1 and L2 form the second axis AXIS_Y to a boundary of the first color comparison image IMAGE_R_C may be equal to each other.

In some example embodiments, the second scaling unit 700 may scale the first image data using different scaling rates with respect to the reference point P_C. That is, by concentrating the lights output from the sub-pixels R, and B included in one pixel to one point as possible, the phenomenon that the colors are seen to be distinguished for the user at edges of objects in the image may be mitigated.

Referring to FIG. 7, the second scaling unit 700 may include a divider 710, a scaler 720, and an integrator 730.

The divider 710 may divide the first image data into partial image data.

In some example embodiments, the divider 710 may divide the first image data into partial data based on at least one of hues and regions. Here, the hues may be colors constituting an image displayed based on the first image data (or may be colors emitted by the sub-pixels in the display panel), and each of the regions may correspond to a part of the image. That is, the divider 710 may color-divide and/or space-divide the first image data. For example, when the first image data may include first to third color data, the divider 710 may divide the first image data into the first to third color data (or extract the first to third color data from the first image data) and may divide at least one of the first through third color data into partial image data. Here, each of the first through third color data may be composed of data values of the same color (e.g., a red color, a green color, a blue color) or the same type. Hereinafter, for convenience of explanation, it is assumed that the first image data is the first color data (or the first color rendering data).

Figure 8C:
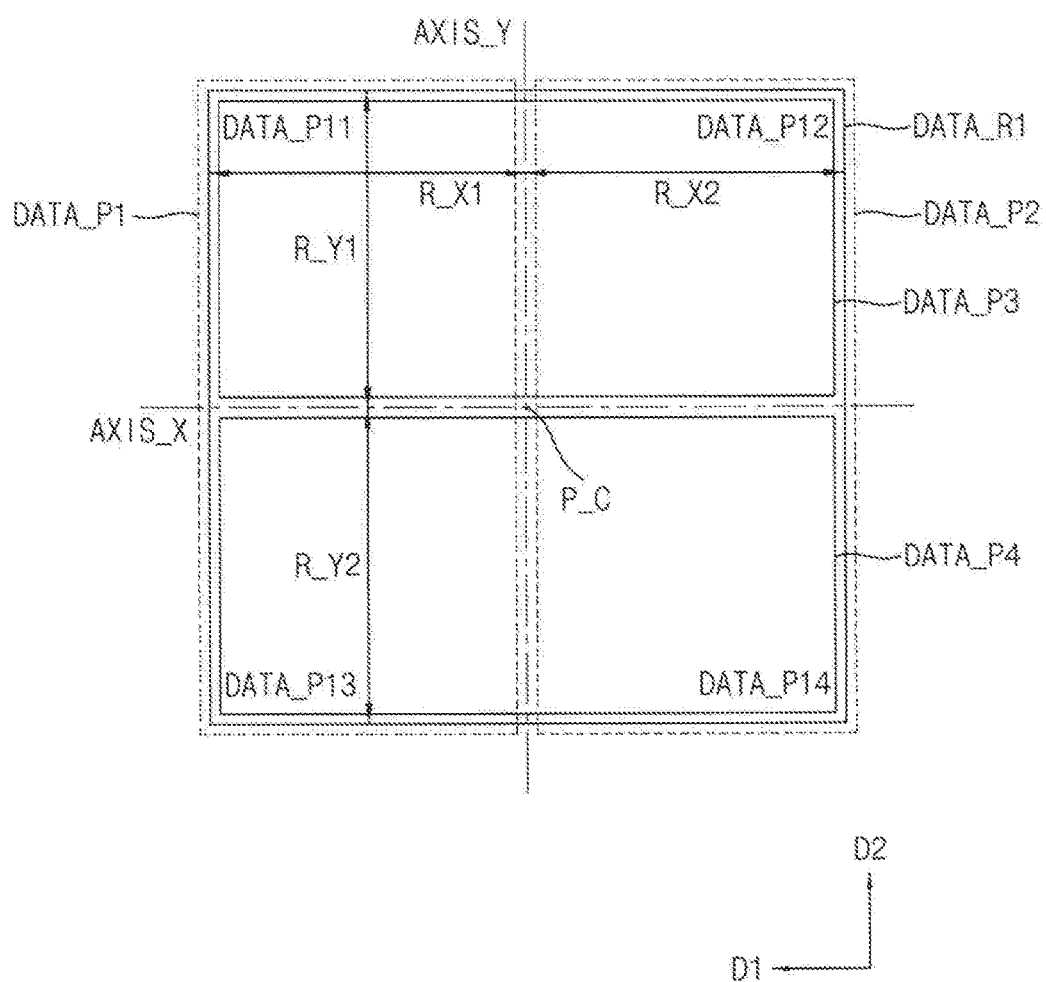
FIGS. 8C and 8D are diagrams illustrating scaling variables used in the second scaling unit of FIG. 7.

Referring to FIG. 8C, the divider 710 may divide the first image data (e.g., the first color data DATA_R) based on the second axis AXIS_Y extending in the second direction D2 with respect to the reference point P_C of the image (or a second axis AXIS_Y extending in the first direction D1). Here, the second direction D2 may be perpendicular to the first direction D1, and the reference point P_C may correspond to the visual axis AXIS_C of the user illustrated in FIG. 8A.

The scaler 720 may generate partial converted data by resizing (or scaling) partial image data based on scaling variables (or scaling factors) which are mutually different.

In some example embodiments, the scaler 720 may scale a first partial data DATA_P1 using a first scaling variable R_X1 in the first direction D1 (e.g., in the horizontal direction), where the first partial data corresponds to a partial image located on a left side of an image with respect to the second axis AXIS_Y (e.g., partial images displayed on a first area A1 and a third area A3 illustrated FIG. 8B). In addition, the scaler 720 may scale a second partial data DATA_P2 using a second scaling variable R_X2 in the first direction D1, where the second partial data corresponds to a partial image located on a right side of the image with respect to the second axis AXIS_Y (e.g., partial images displayed on a second area A2 and a fourth area A4 illustrated FIG. 8B). Here, the second scaling variable R_X2 may be different from the first scaling date variable R_X1. For example, the first scaling variable R_X1 and the second scaling variable R_X2 may be in a range of 0.9 through 1.1, for example, the first scaling variable R_X1 may be 1.005, and the second scaling variable R_X2 may be 1.008.

That is, the scaler 720 may respectively scale the first partial data DATA_P1 and the second partial data DATA_P2 in the first direction D1 (e.g., in the horizontal direction) based on the first scaling variable R_X1 and the second scaling variable R_X2.

The integrator 730 may generate the converted data by combining the partial converted data. For example, the integrator 730 may generate first converted data by combining the resized first and second partial data.

Thereafter, the second scaling unit 700 may generate second converted data by re-dividing, by re-sizing and by re-integrating the first converted data.

The divider 710 may divide the first converted data (e.g., the first color data which is converted primarily) based on the first axis AXIS_X extending in the first direction D1 (or the second axis AXIS_Y extending in the second direction D2) with respect to the reference point P_C of the image.

After this, the scaler 720 may scale a third partial data DATA_P3 using a third scaling variable R_Y1 in the second direction D2 (e.g., in the vertical direction), where the third partial data corresponds to a partial image located on an upper side of the image with respect to the first axis AXIS_X (e.g., partial images displayed on the first area A1 and the second area A2 illustrated FIG. 8B). In addition, the scaler 720 may scale a fourth partial data DATA_P4 using a fourth scaling variable R_Y2 in the second direction D2, where the fourth partial data corresponds to a partial image located on a lower side of the image with respect to the first axis AXIS_X (e.g., partial images displayed on the third area A3 and the fourth area A4 illustrated FIG. 8B). Here, the fourth scaling variable R_Y2 may be different from the third scaling date variable R_Y1. For example, the third scaling variable R_Y1 and the fourth scaling variable R_Y2 may be in a range of 0.9 through 1.1, for example, the third scaling variable R_Y1 may be 1.003, and the fourth scaling variable R_Y2 may be 1.008.

That is, the scaler 720 may respectively scale the third partial data DATA_P3 and the fourth partial data DATA_P4 in the second direction D2 (e.g., in the vertical direction) based on the third scaling variable R_Y1 and the fourth scaling variable R_Y2.

Then, the integrator 730 may generate the second converted data by combine the resized third and fourth partial data (or partial converted data).

In FIGS. 7 and 8C, the second scaling unit 700 divides and resizes the first image data based on the second axis AXIS_Y, and resizes the first image data (or first converted data) based on the first axis AXIS_X. However, the second scaling unit 700 is not limited thereto. For example, the second scaling unit 700 may divide and resize the first image data based on the first axis AXIS_X primarily, and may resize the first image data based on the second axis AXIS_Y secondarily.

In another example, the second scaling unit 700 may divide the first image data (e.g., the first color data DATA_R) into 11th through 14th partial data DATA_P11, DATA_P12, DATA_P13, and DATA_P14 based on the first axis AXIS_X extending in the first direction D1 and the second axis AXIS_Y extending in the second direction D2 with respect to the reference point P_C of the image. After this, the second scaling unit 700 may scale (or resize) the 11th partial data DATA_P11 using the first scaling variable R_X1 and the third scaling variable R_Y1, may scale the 12th partial data DATA_P12 using the second scaling variable R_X2 and the third scaling variable R_Y1, may scale the 13th partial data DATA_P13 using the first scaling variable R_X1 and the fourth scaling variable R_Y2, and may scale the 14th partial data DATA_P14 using the second scaling variable R_X2 and the fourth scaling variable R_Y2. The second scaling unit 700 may generate and output the converted data by combine the first through fourth partial data (or the partial converted data) which are resized.

In some example embodiments, the first scaling variable R_X1 may be determined or set based on position information of a first reference sub-pixel. The first reference sub-pixel may be located at the outermost position in the first direction D1 of the sub-pixels.

Figure 8D:
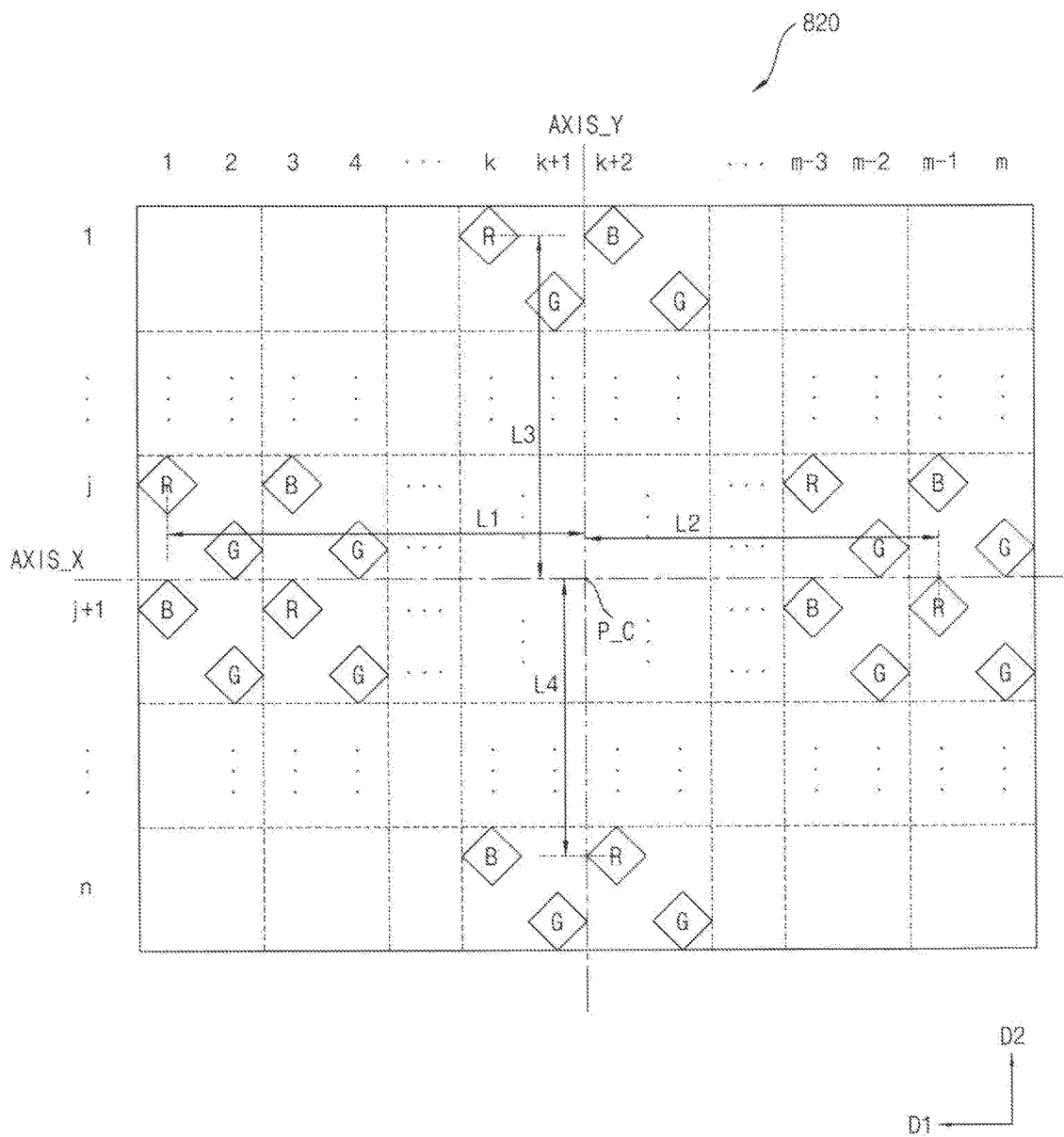

Referring to FIG. 8D, as described with reference to FIG. 3A, the display panel 820 may include sub-pixels R, and B arranged in the RGBG format.

The reference point P_C may be an intersection point of the first axis AXIS_X and the second axis AXIS_Y. The first axis AXIS_X may be between the jth pixel row and the j+1th pixel row, and the second axis AXIS_Y may be between a k+1th pixel column and the k+2th pixel column, where each of j and k is integer greater than or equal to 2. Here, a first distance L1 from the jth pixel row to a sub-pixel R located in the outermost position in the first direction D1 (e.g., a distance from the second axis AXIS_Y, or a distance in the first direction D1) may be different from a second distance L2 from the jth pixel row to a sub-pixel R located in the outermost position in a direction opposite to the first direction D1.

Similarly, a third distance L3 from the kth pixel column to a sub-pixel R located in the outermost position in the second direction D2 (e.g., a distance from the first axis AXIS_X, or a distance in the second direction D2) may be different from a fourth distance L4 from the kth pixel column to a sub-pixel R located in the outermost position in a direction opposite to the second direction D2.

Therefore, the first scaling variable R_X1 may be determined to be proportional to (or inversely proportional to) the first distance L1. Similarly, the second scaling variable R_X2, the third scaling variable R_Y1 and the fourth scaling variable R_Y2 may be proportional to (or inversely proportional to) the second through fourth distances L2 through L4, respectively.

In FIG. 8D, the first reference sub-pixel is located outermost of the display panel 820. However, the embodiments are not limited thereto. For example, the first reference sub-pixel may be a pixel corresponding to the outermost of the image data instead of the display panel 820.

Figure 8E:
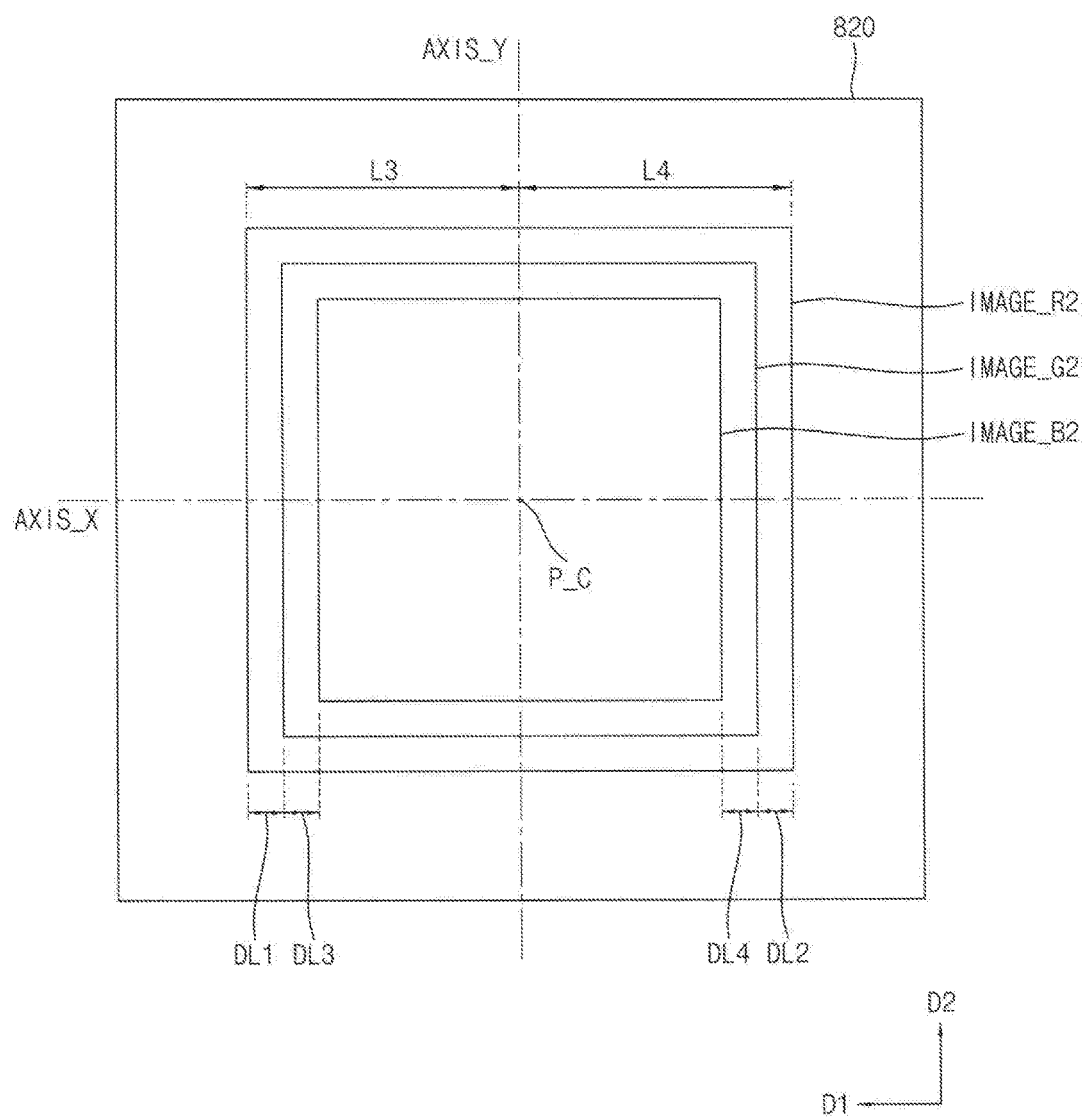
FIG. 8E is a diagram illustrating converted data generated by the second scaling unit of FIG. 7.

Referring to FIG. 8E, first color image IMAGE_R2, second color image IMAGE_G2, and third color image IMAGE_B2 may be displayed on the display panel 820 based on the converted data generated by the second scaling unit 700.

As described with reference to FIG. 8B, even through the first color data is symmetric with respect to the reference point P_C in the first direction D1 and in the second direction D2, the distances L3 and L4 from the second axis AXIS_Y to the edge of the first color image IMAGE_R2 may be different from each other.

The first color image IMAGE_R2 may be larger than the second color image IMAGE_G2 by a first difference DL1 in the first direction D1 and by a second difference DL2 in a direction opposite to the first direction D1. When the second color image IMAGE_G2 is the same as the second color comparison image IMAGE_G_C illustrated in FIG. 8B (or when the second color image IMAGE_G2 is not subjected to a chromatic aberration correction process), the second difference DL2 may be different from the first difference DL1 because the first and second scaling variables R_X1 and R_X2 are mutually different.

Similarly, the third color image IMAGE_B2 may be smaller than the second color image IMAGE_G2 by a third difference DL3 in the first direction D1 and by a fourth difference DL4 in the direction opposite to the first direction D1. The fourth difference DL4 may be different from the third difference DL3 because the first and second scaling variables R_X1 and R_X2 for the third color image IMAGE_B2 are determined to be different from each other.

Figure 8F:
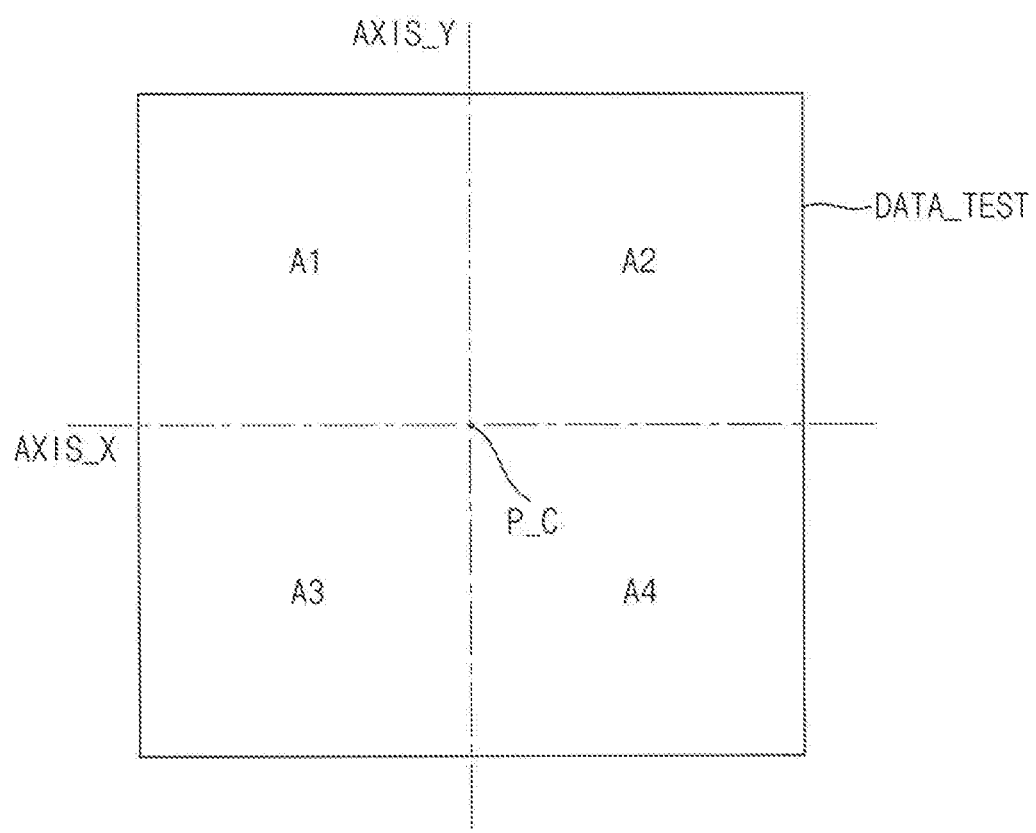
FIG. 8F is a diagram illustrating test data provided to the second scaling unit of FIG. 7.

Referring to FIG. 8F, the test data DATA_TEST may include partial data corresponding to the first to fourth areas A1 through A4, and the partial data may have the same size (or area) and may different data values.

For example, the first through fourth partial data may include data values corresponding to 100*100 pixels. The first partial data corresponding to the first area A1 may include only grayscale value of 255, and the second partial data corresponding to the second area A2 may include only grayscale value of 0. Similarly, the third partial data corresponding to the third area A3 may include only grayscale value of 0, and the fourth partial data corresponding to the fourth area A4 may include only grayscale value of 255.

In an example embodiment, the test data DATA_TEST may include valid data values arranged in a checkered pattern. It can be determined whether to perform a chromatic aberration correction by comparing sizes of the checkered image displayed corresponding to the valid data values for each of the areas A1 through A4.

As described with reference to FIG. 7 through 8F, the second scaling unit 700 (or the display device 200) according to example embodiments may resize or scale the first image data using scaling variables respectively determined for each direction with respect to the reference point (e.g., the visual axis of the user). Here, the scaling variables may be the same or different from each other. Particularly, the second scaling unit 700 may resize the first image data using different scaling variables such that a color separation phenomenon at edges of objects in the image due to the arrangement (or positional difference) of sub-pixels may be mitigated.

In FIGS. 7 through 8F, the second scaling unit 700 up-scales the first color data (e.g., red data) and down-scales the third color data (e.g., blue data) with respect to the second color data (e.g., green data). However, the second scaling unit 700 is not limited thereto. For example, the second scaling unit 700 may down-scale the second color data (e.g., green data) and the third color data (e.g., blue data) with respect to the first color data (e.g., red data). For example, the second scaling unit 700 may up-scale the first color data (e.g., red data) and the second color data (e.g., green data) with respect to the third color data (e.g., blue data).

Figure 9B:
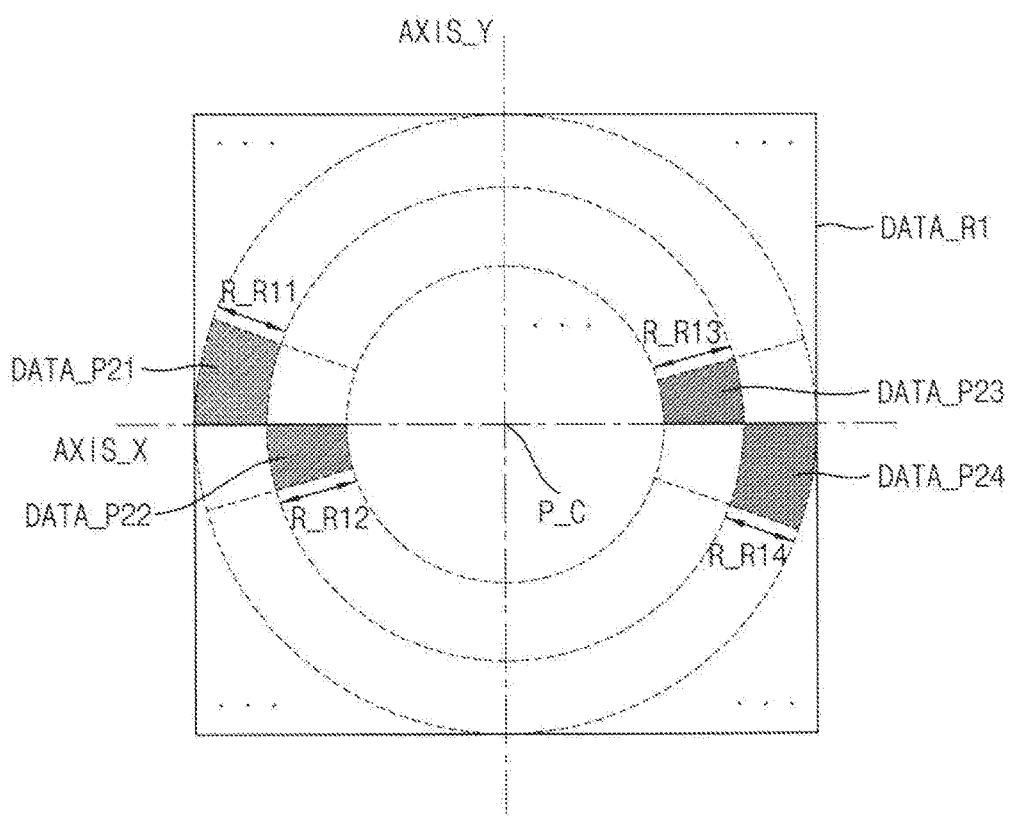
FIGS. 9B and 9C are diagrams illustrating an example of converted data generated by the second scaling unit of FIG. 7.
Figure 9C:
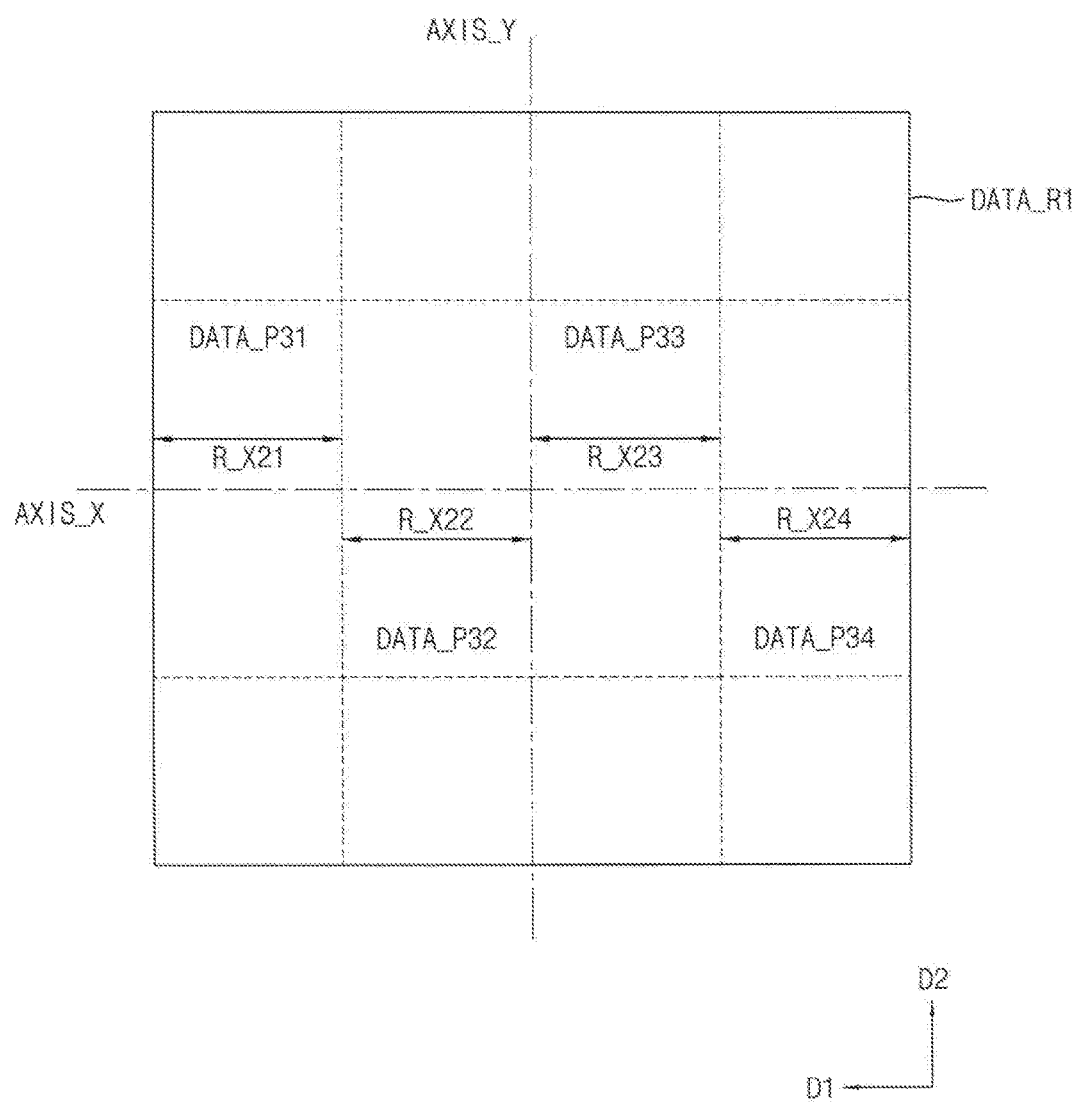

FIG. 9A is a diagram illustrating examples of scaling variables used in the second scaling unit 700 of FIG. 7. FIGS. 9B and 9C are diagrams illustrating an example of converted data generated by the second scaling unit 700 of FIG. 7.

Referring to FIGS. 7, 8D, 9A and 9B, the second scaling unit 700 (or the scaler 720) may respectively determine scaling variables (e.g., 11th through 14th scaling variables R_R11 through R_R14) based on distances of the sub-pixels with respect to the reference point P_C of the display panel 820 and may resize the first image data based on the scaling variables. That is, the second scaling unit 700 (or the scaler 720) may respectively determine the scaling variables (e.g., the 11th through 14th scaling variables R_R11 through R_R14) based on distances from a specified point of the image (e.g., the reference point, or a point corresponding to the reference point P_C of the display panel 820) to monochromatic lights constituting the image and may resize the first image data based on the scaling variables. Here, the image may be displayed on the display panel 820, the monochromatic lights may be emitted by the sub-pixels in the display panel, the specified point (or the reference point) and monochromatic lights may be on the same plane (e.g., on a display panel). Here, the distances of the monochromatic lights may be substantially equal to the distances L11 through L14 of the sub-pixels.

Similar to the first scaling variable R_X1 described with reference to FIG. 8B, the 11th to 14th scaling variables R_R11 to R_R14 may be respectively proportional to the distances L1 through L4 of the sub-pixels or may be respectively proportional to square of the distances L1 through L4 of the sub-pixels. Therefore, the 11th to 14th scaling variables R_R11 to R_R14 may be different from each other.

For example, the 11th scaling variable R_R11 for a 21st partial data DATA_P21 may be different from a 12th scaling variable R_R12 for a 22nd partial data DATA_P22. Here, the 21st partial data DATA_P21 may correspond to a first reference sub-pixel P_R1 (e.g., a sub-pixel R located in intersection of the jth row and a first column of the display panel 820), and the 22nd partial data DATA_P22 may correspond to a second reference sub-pixel P_R2 (e.g., a sub-pixel R located in intersection of the j+1th row and a third column of the display panel 820). The 21st partial data DATA_P21 and the 22nd partial data DATA_P22 may be included in the first color data DATA_R1 described with reference to FIG. 8C. For example, the 11th scaling variable R_R11 and the 12th scaling variable R_R12 may be in a range of 0.9 through 1.1, the 11th scaling variable R_R11 may be 1.005, and the 12th scaling variable R_R12 may be 1.003.

Here, the second scaling unit 700 may resize the 21th partial data DATA_P21 in a direction toward a center of a circle (e.g., in a direction from the reference point P_C to the first reference sub-pixel P_R1) using the 11th scaling variable R_R11 and may resize the 22nd partial data DATA_P22 in a direction toward a center of a circle (e.g., in a direction from the reference point P_C to the second reference sub-pixel P_R2) using the 12th scaling variable R_R12.

Similarly, a 13th scaling variable R_R13 for a 23rd partial data DATA_P23 may be different from a 14th scaling variable R_R14 for a 24th partial data DATA_P24. Here, the 23rd partial data DATA_P23 may correspond to a third reference sub-pixel P_R3 (e.g., a sub-pixel R located in intersection of the jth row and a m−3th column of the display panel 820), and the 24th partial data DATA_P24 may correspond to a fourth reference sub-pixel P_R4 (e.g., a sub-pixel R located in intersection of the j+1th row and a m−1th column of the display panel 820). The 23rd partial data DATA_P23 and the 24th partial data DATA_P24 may be included in the first color data DATA_R1 described with reference to FIG. 8C. For example, the 13th scaling variable R_R13 and the 14th scaling variable R_R14 may be in a range of 0.9 through 1.1, the 13th scaling variable R_R13 may be 1.004, and the 14th scaling variable R_R14 may be 1.002.

Here, the second scaling unit 700 may resize the 23rd partial data DATA_P23 in a direction toward a center of a circle (e.g., in a direction from the reference point P_C to the third reference sub-pixel P_R3) using the 13th scaling variable R_R13 and may resize the 24th partial data DATA_P24 in a direction toward a center of a circle (e.g., in a direction from the reference point P_C to the fourth reference sub-pixel P_R4) using the 14th scaling variable R_R14.

That is, the second scaling unit 700 may mitigate color separation phenomenon at edges of objects in the image due to an arrangement of the sub-pixels by respectively resizing (or by remapping, by compensating) the partial data (or data values included in the partial data) in the image data.

In FIGS. 9A and 9B, the second scaling unit 700 determines the scaling variables R_R11 to R_R14 in the direction of the center of a circle. However, the second scaling unit 700 is limited thereto.

Referring to FIGS. 9A and 9C, the second scaling unit 700 may determine a 21st scaling variable R_X21 based on a component in the first direction of the 11th distance L11 and may resize 31st partial data DATA_P31 in the first direction D1. Here, the 31st partial data DATA_P31 may correspond to the first reference sub pixel P_R1 and may be included in the first color data DATA_R1. Similarly, the second scaling unit 700 may determine 22nd through 24th scaling variable R_X22 through R_X24 based on components in the first direction of the 12th through 14th distances L12 through L14 and may resize 32nd through 34th partial data DATA_P32 through DATA_P34 in the first direction D1, respectively. Here, the 32nd through 34th partial data DATA_P32 through DATA_P34 may respectively correspond to the second through fourth reference sub pixel P_R2 through P_R4 and may be included in the first color data DATA_R1.

The second scaling unit 700 may determine vertical scaling variables (e.g., scaling variables in the second direction D2) for the 31st to 34th partial data DATA_P31 through DATA_P34 based on a component in the second direction D2 of the 11th through 14th distances L11 through L14, respectively.

As described above, the second scaling unit 700 may determine scaling variables (e.g., the 11th through 14th scaling variables R_R11 through R_R14) based on distances of the sub-pixels with respect to the reference point P_C of the display panel 820 (e.g., based on the 11th through 14th distances L11 through L14) and may resize the first image data (or data values included in the first image data) based on the scaling variables. Therefore, the second scaling unit 700 may mitigate color separation phenomenon at edges of objects in the image due to an arrangement of the sub-pixels The present inventive concept may be applied to any display device (e.g., an organic light emitting display device, a liquid crystal display device, etc). For example, the present inventive concept may be applied to a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings of example embodiments. Accordingly, all such modifications are intended to be included within the scope of example embodiments as defined in the claims. In the claims, any means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. An image processor comprising:
   a scaling unit configured to output converted data by resizing first image data; and
   a rendering unit configured to receive second image data, to output rendering data by rendering the second image data, and to calculate a target rendering data value based on data values corresponding to a first block of M*N among the second image data, where each of M and N is an integer greater than or equal to 2,
   wherein the second image data is the converted data, or the first image data is the rendering data,
   wherein the rendering unit reconstruct the second image data of a first format into the rendering data of a second format predetermined based on arrangement of pixels,
   wherein the rendering unit is configured to calculate the target rendering data value by weight-averaging the data values,
   wherein the second image data includes a first type data value, a second type data value, and a third type data value sequentially and repeatedly arranged in a first direction,
   wherein the rendering data includes a fourth type data value, a fifth type data value, a sixth type data value, and a seventh type data value sequentially and repeatedly arranged in the first direction, and
   wherein the first type data value and the fourth type data value corresponds to a first pixel configured to emit light with a first color, the second type data value, the fifth type data value, and the seventh type data value corresponds to a second pixel configured to emit light with a second color, and the third type data value and the sixth type data value corresponds to a third pixel configured to emit light with a third color.

2. An image processor comprising:
a scaling unit configured to output converted data by resizing first image data; and
a rendering unit configured to receive second image data, to output rendering data by rendering the second image data, and to calculate a target rendering data value based on data values corresponding to a first block of M*N among the second image data, where each of M and N is an integer greater than or equal to 2,
wherein the second image data is the converted data, or the first image data is the rendering data,
wherein the rendering unit reconstruct the second image data of a first format into the rendering data of a second format predetermined based on arrangement of pixels,
wherein the rendering unit is configured to render the second image data using a first sub-filter having weight values for the data values, and
wherein the first block has a size of 2*2, wherein the first sub-filter has a first weight value for a first target data value among the data values, a second weight value for a first adjacent data value which is adjacent to the first target data value in a first direction, a third weight value for a second adjacent data value which is adjacent to the first target data value in a second direction, and a fourth weight value for a third adjacent data value which is adjacent to the second target data value in the first direction, and
wherein the second direction is perpendicular to the first direction.

3. An image processor comprising:
a scaling unit configured to output converted data by resizing first image data; and
a rendering unit configured to receive second image data, to output rendering data by rendering the second image data, and to calculate a target rendering data value based on data values corresponding to a first block of M*N among the second image data, where each of M and N is an integer greater than or equal to 2,
wherein the second image data is the converted data, or the first image data is the rendering data,
wherein the rendering unit reconstruct the second image data of a first format into the rendering data of a second format predetermined based on arrangement of pixels,
wherein the rendering unit is configured to operate in a normal mode or in a wearable mode, render the second image data using a second sub-filter in the normal mode, and render the second image data using a first sub-filter in the wearable mode,
wherein the first sub-filter has a first weight value for a first target data value among the data values, a second weight value for a first adjacent data value which is adjacent to the first target data value in a first direction, a third weight value for a second adjacent data value which is adjacent to the first target data value in a second direction, and a fourth weight value for a third adjacent data value which is adjacent to the second target data value in the first direction,
wherein the second sub-filter has a twenty-first weight value for the first target data value and a twenty-second weight value for the first adjacent data value, and
wherein the second direction is perpendicular to the first direction.

4. An image processor comprising:
a scaling unit configured to output converted data by resizing first image data; and
a rendering unit configured to receive second image data, to output rendering data by rendering the second image data, and to calculate a target rendering data value based on data values corresponding to a first block of M*N among the second image data, where each of M and N is an integer greater than or equal to 2,
wherein the second image data is the converted data, or the first image data is the rendering data,
wherein the rendering unit reconstruct the second image data of a first format into the rendering data of a second format predetermined based on arrangement of pixels,
wherein the scaling unit is configured to determine scaling variables based on distances of sub-pixels arranged in a display panel with respect to a reference point on the display panel configured to display an image based on the converted data or the rendering data, and
wherein the scaling unit resizes the first image data based on the scaling variables,
wherein the scaling unit is configured to extract color data consisted with a same color from the first image data and resize at least one of the color data based on the scaling variables,
wherein the scaling unit is configured to divide the at least one of the color data into partial image data, generate partial converted data by resizing the partial image data based on the scaling variables, and generate the converted data by combining the partial converted data,
wherein the scaling unit is configured to divide the at least one of the color data into eleventh, twelfth, thirteenth, and fourteenth partial data based on a first axis and a second axis, the first axis extending in a second direction with respect to a reference point of an image corresponding to the at least one of the color data, the second axis extending in a second direction with respect to the reference point of the image,
wherein the scaling unit is configured to resize the eleventh partial data using a first scaling variable and a third scaling variable,
wherein the scaling unit is configured to resize the twelfth partial data using a second scaling variable and the third scaling variable,
wherein the scaling unit is configured to resize the thirteenth partial data using the first scaling variable and a fourth scaling variable,
wherein the scaling unit is configured to resizes the fourteenth partial data using the third scaling variable and the fourth scaling variable,
wherein the second direction is perpendicular to the first direction,
wherein the second scaling variable is different from the first scaling variable, and
wherein the fourth scaling variable is different from the third scaling variable.

5. An image processor comprising:
a scaling unit configured to output converted data by resizing first image data; and
a rendering unit configured to receive second image data, to output rendering data by rendering the second image data, and to calculate a target rendering data value based on data values corresponding to a first block of M*N among the second image data, where each of M and N is an integer greater than or equal to 2, wherein the second image data is the converted data, or the first image data is the rendering data, wherein the rendering unit reconstruct the second image data of a first format into the rendering data of a second format predetermined based on arrangement of pixels, wherein the scaling unit is configured to determine scaling variables based on distances of sub-pixels arranged in a display panel with respect to a reference point on the display panel configured to display an image based on the converted data or the rendering data, wherein the scaling unit resizes the first image data based on the scaling variables, wherein the scaling unit is configured to extract color data consisted with a same color from the first image data and resize at least one of the color data based on the scaling variables, wherein the scaling unit is configured to divide the at least one of the color data into partial image data, generate partial converted data by resizing the partial image data based on the scaling variables, and generate the converted data by combining the partial converted data, wherein the scaling unit is configured to divide the at least one of the color data into first partial data and second partial data based on a second axis extending in a second direction with respect to a reference point of an image corresponding to the at least one of the color data, wherein the scaling unit is configured to resize the first partial data using a first scaling variable and the second partial data using a second scaling variable, and wherein the second scaling variable is different from the first scaling variable.

6. The image processor of claim 5, wherein the scaling unit is configured to divide resized color data into third partial data and fourth partial data based on a first axis extending in a first direction with respect to the reference point of the image, wherein the scaling unit is configured to resize the third partial data using a third scaling variable and the fourth partial data using a fourth scaling variable, wherein the resized color data includes the resized first partial data and the resized second partial data, and wherein the fourth scaling variable is different from the third scaling variable.

7. A display device comprising:

an image processor configured to output second data by converting first data;

a display panel including pixels; and a data driver configured to generate data signals based on the second data and to provide the data signals to the pixels, wherein the image processor includes:

a scaling unit configured to output converted data by resizing first image data; and a rendering unit configured to receive second image data, to output rendering data by rendering the second image data and to calculate a target rendering data value based on data values corresponding to a first block of M*N among the second image data, where each of M and N is an integer greater than or equal to 2, and wherein the second image data is the converted data, or the first image data is the rendering data, wherein the rendering unit reconstruct the second image data of a first format into the rendering data of a second format predetermined based on arrangement of pixels, wherein the scaling unit is configured to extract color data consisted with a same color from the first image data and resizes at least one of the color data based on scaling variables, wherein the display panel is divided into areas with respect to a reference point of an image, wherein the scaling unit is configured to divide the at least one of the color data into partial data corresponding to the areas, generate partial converted data by resizing the partial data based on the scaling variables, and generate the converted data by combining the partial converted data, wherein the scaling unit is configured to divide the at least one of the color data into first partial data and second partial data based on a second axis extending in a second direction with respect to the reference point, wherein the scaling unit is configured to resize the first partial data using a first scaling variable and the second partial data using a second scaling variable, wherein the second scaling variable is different from the first scaling variable, and wherein the reference point corresponds to a visual axis of a user.

8. The display device of claim 7, wherein the first scaling variable is determined based on location information of a first sub-pixel, and wherein the first sub-pixel is included in the pixels and located in an outermost position in a first direction perpendicular to the second direction.

\* \* \* \* \*